(12) United States Patent
Nakajima

(10) Patent No.: US 12,510,125 B2
(45) Date of Patent: Dec. 30, 2025

(54) HUB FOR HUMAN-POWERED VEHICLE

(71) Applicant: Shimano Inc., Osaka (JP)

(72) Inventor: Jun Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 108 days.

(21) Appl. No.: 18/101,829

(22) Filed: Jan. 26, 2023

(65) Prior Publication Data

US 2024/0253393 A1 Aug. 1, 2024

(51) Int. Cl.
*F16D 41/36* (2006.01)
*B60B 27/02* (2006.01)
*B60B 27/04* (2006.01)

(52) U.S. Cl.
CPC ............ *F16D 41/36* (2013.01); *B60B 27/023* (2013.01); *B60B 27/047* (2013.01)

(58) Field of Classification Search
CPC ... B60B 27/023; B60B 27/047; B60B 27/043; F16D 41/36
See application file for complete search history.

(56) References Cited

U.S. PATENT DOCUMENTS

| | | | | |
|---|---|---|---|---|
| 5,964,332 A * | 10/1999 | King | ..................... | B60B 27/023 192/64 |
| 2019/0217662 A1* | 7/2019 | Nakajima | ............. | B60B 27/047 |
| 2020/0398611 A1* | 12/2020 | Nakajima | ........... | B60B 27/0026 |
| 2022/0213939 A1* | 7/2022 | Oka | ...................... | B60B 27/026 |

\* cited by examiner

*Primary Examiner* — Richard M Lorence
(74) *Attorney, Agent, or Firm* — Global IP Counselors, LLP

(57) ABSTRACT

A hub is provided for a human-powered vehicle. The hub includes a hub axle, a first rotating body, a second rotating body, a first ratchet member, a second ratchet member and a slider. The first rotating body and the second rotating body are rotatably mounted on the hub axle. The first ratchet member rotates with the first rotating body. The second ratchet member rotates with the second rotating body. The slider rotates with the first rotating body and slide with respect to the second rotating body in a circumferential direction. The slider has a first contact surface in sliding contact with an axially facing surface of the second ratchet member. The slider has a second contact surface in sliding contact with a radially facing surface of the second ratchet member.

22 Claims, 16 Drawing Sheets

HUB FOR HUMAN-POWERED VEHICLE

BACKGROUND

Technical Field

This disclosure generally relates to a hub for a human-powered vehicle.

Background Information

Some wheels for human-powered vehicles (e.g., bicycle) have a hub, a plurality of spokes and an annular rim. The hub has a hub axle that is non-rotatably mounted to a frame of the human-powered vehicle. The hub has a hub shell that is coaxially coupled to the hub axle so that the hub shell is disposed radially outwardly with respect to the hub axle. The bearings are configured and arranged to support the hub shell so that the hub shell can freely rotate around the hub axle. In almost all types of bicycles except fixed gear and track racers, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary.

SUMMARY

Generally, the present disclosure is directed to various features of a hub for a human-powered vehicle. The term "human-powered vehicle" as used herein refers to a vehicle that can be propelled by at least human driving force to produce propulsion, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub for a human-powered vehicle is provided that basically comprises a hub axle, a first rotating body, a second rotating body, a first ratchet member, a second ratchet member and a slider. The hub axle defines a center axis. The first rotating body is rotatably mounted on the hub axle to rotate around the center axis. The second rotating body is rotatably mounted on the hub axle to rotate around the center axis. The first ratchet member has at least one first ratchet tooth. The first ratchet member is coupled to the first rotating body to rotate with the first rotating body. The second ratchet member has at least one second ratchet tooth mating with the at least one first ratchet tooth. The second ratchet member is coupled to the second rotating body to rotate with the second rotating body. The slider is configured to rotate with the first rotating body and to slide with respect to the second rotating body in a circumferential direction with respect to the center axis. The slider has a first contact surface in sliding contact with an axially facing surface of one of the first ratchet member and the second ratchet member coupled to the second rotating body. The slider has a second contact surface in sliding contact with a radially facing surface of the one of the first ratchet member and the second ratchet member coupled to the second rotating body. The first contact surface is a different material than the second contact surface.

With the hub according to the first aspect, the slider can generate a desired amount of frictional force between the slider and the second ratchet member in which the variation in the frictional force is small and in which the frictional force increases stably.

In accordance with a second aspect of the present disclosure, a hub for a human-powered vehicle is provided that basically comprises a hub axle, a first rotating body, a second rotating body, a first ratchet member, a second ratchet member and a slider. The hub axle defines a center axis. The first rotating body is rotatably mounted on the hub axle to rotate around the center axis. The second rotating body is rotatably mounted on the hub axle to rotate around the center axis. The first ratchet member has at least one first ratchet tooth. The first ratchet member is coupled to the first rotating body to rotate with the first rotating body. The second ratchet member has at least one second ratchet tooth mating with the at least one first ratchet tooth. The second ratchet member is coupled to the second rotating body to rotate with the second rotating body. The slider is configured to rotate with the first rotating body and to slide with respect to the second rotating body in a circumferential direction with respect to the center axis. The slider has a first contact surface in sliding contact with an axially facing surface of one of the first ratchet member and the second ratchet member coupled to the second rotating body. The slider has a second contact surface in sliding contact with a radially facing surface of the one of the first ratchet member and the second ratchet member coupled to the second rotating body. The slider includes a first slider part and a second slider part. The first slider part includes the first contact surface. The second slider part includes the second contact surface. The first slider part is non-movably fixed to the second slider part.

With the hub according to the second aspect, the slider can generate a desired amount of frictional force between the slider and the second ratchet member in which the variation in the frictional force is small and in which the frictional force increases stably.

In accordance with a third aspect of the present disclosure, a hub for a human-powered vehicle is provided that basically comprises a hub axle, a first rotating body, a second rotating body, a first ratchet member, a second ratchet member and a slider. The hub axle defines a center axis. The first rotating body is rotatably mounted on the hub axle to rotate around the center axis. The second rotating body is rotatably mounted on the hub axle to rotate around the center axis. The first ratchet member has at least one first ratchet tooth. The first ratchet member is coupled to the first rotating body to rotate with the first rotating body. The second ratchet member has at least one second ratchet tooth mating with the at least one first ratchet tooth. The second ratchet member is coupled to the second rotating body to rotate with the second rotating body. The slider is configured to rotate with the first rotating body and to slide with respect to the second rotating body in a circumferential direction with respect to the center axis. The slider has a first contact surface in sliding contact with an axially facing surface of one of the first ratchet member and the second ratchet member coupled to the second rotating body. The slider has a second contact surface in sliding contact with a radially facing surface of the one of the first ratchet member and the second ratchet member coupled to the second rotating body. The first contact surface is spaced from the center axis by a first radial distance. The second contact surface is spaced from the center axis by a second radial distance. The second radial distance is equal to or less than the first radial distance.

With the hub according to the third aspect, the slider can generate a desired amount of frictional force between the slider and the second ratchet member in which the variation in the frictional force is small and in which the frictional force increases stably.

In accordance with a fourth aspect of the present disclosure, the hub according to any one of the first aspect to the third aspect is configured so that the slider has a first anti-rotation portion mating with a second anti-rotation portion of the first rotating body. The first anti-rotation portion and the second anti-rotation portion are configured to mate together so as to allow axial movement of the slider relative to the first rotating body in an axial direction with respect to the center axis. The at least one first ratchet tooth and the at least one second ratchet tooth are changed from disengaged to engaged while the slider rotates with the second ratchet member with respect to the first ratchet member in a circumferential direction with respect to the center axis.

With the hub according to the fourth aspect, the first rotating body and the slider can rotate together in a state where the at least one first ratchet tooth and the at least one second ratchet tooth are engaged, while allowing for axial movement of the slider relative to the first rotating body as the at least one first ratchet tooth and the at least one second ratchet tooth are changed from disengaged to engaged.

In accordance with a fifth aspect of the present disclosure, the hub according to any one of the first aspect to the fourth aspect is configured so that the slider has a first anti-rotation portion mating with a second anti-rotation portion of the first rotating body. The first anti-rotation portion includes at least one first circumferentially-facing surface. The second anti-rotation portion includes at least one second circumferentially-facing surface that abuts the at least one first circumferentially-facing surface in the circumferential direction with respect to the center axis. At least one of the at least one first circumferentially-facing surface and the at least one second circumferentially-facing surface includes an inclined surface inclined relative to the axial direction with respect to the center axis.

With the hub according to the fifth aspect, the slider can be reliably moved in the circumferential direction relative to the first rotating body as the at least one first ratchet tooth and the at least one second ratchet tooth are changed from disengaged to engaged. Also, damage due to collision between the first ratchet tooth and the second ratchet tooth can be reduced.

In accordance with a sixth aspect of the present disclosure, the hub according to any one of the first aspect to the fifth aspect is configured so that the first contact surface includes a resin material.

With the hub according to the sixth aspect, the first contact surface can reliably slide along the axially facing surface.

In accordance with a seventh aspect of the present disclosure, the hub according to any one of the first aspect to the sixth aspect is configured so that the second contact surface includes an elastomeric material.

With the hub according to the seventh aspect, the frictional force between the slider and the second ratchet member can increase in a stable manner.

In accordance with an eighth aspect of the present disclosure, the hub according to any one of the first aspect to the seventh aspect is configured so that the first contact surface and the second contact surface are annular surfaces arranged around the center axis.

With the hub according to the eighth aspect, the frictional force between the slider and the second ratchet member can evenly distributed around center axis.

In accordance with a ninth aspect of the present disclosure, the hub according to any one of the first aspect to the eighth aspect is configured so that the slider includes a first slider part including the first contact surface, a second slider part including the second contact surface, and a third slider part non-rotatably coupled to the first slider part and the second slider part.

With the hub according to the ninth aspect, the desired frictional force generated by the slider can be effectively obtained.

In accordance with a tenth aspect of the present disclosure, the hub according to the ninth aspect is configured so that the third slider part includes a different material from the second slider part.

With the hub according to the tenth aspect, the second slider part can be reliably supported in the axial direction by the third slider.

In accordance with an eleventh aspect of the present disclosure, the hub according to the ninth aspect or the tenth aspect is configured so that the first slider part includes a resin material. The second slider part includes an elastomeric material. The third slider part includes a resin material.

With the hub according to the eleventh aspect, the desired frictional force generated by the slider can be effectively obtained and the second slider can be reliably supported in the axial direction by the first slider part and the third slider.

In accordance with a twelfth aspect of the present disclosure, a hub for a human-powered vehicle is provided that basically comprises a hub axle, a first rotating body, a second rotating body, a first ratchet member, a second ratchet member and a slider. The hub axle defines a center axis. The first rotating body is rotatably mounted on the hub axle to rotate around the center axis. The second rotating body is rotatably mounted on the hub axle to rotate around the center axis. The first ratchet member has at least one first ratchet tooth. The first ratchet member is coupled to the first rotating body to rotate with the first rotating body. The second ratchet member has at least one second ratchet tooth mating with the at least one first ratchet tooth. The second ratchet member is coupled to the second rotating body to rotate with the second rotating body. The slider is configured to rotate with the first rotating body and to slide with respect to the second rotating body in a circumferential direction with respect to the center axis. The slider has a first anti-rotation portion mating with a second anti-rotation portion of the first rotating body. The first anti-rotation portion includes at least one first circumferentially-facing surface. The second anti-rotation portion includes at least one second circumferentially-facing surface that abuts the at least one first circumferentially-facing surface in a circumferential direction with respect to the center axis. At least one of the at least one first circumferentially-facing surface and the at least one second circumferentially-facing surface includes an inclined surface inclined relative to an axial direction with respect to the center axis.

With the hub according to the twelfth aspect, the second ratchet member moves in an axial direction while rotating in a circumferential direction to minimize axially contact of the tip of the at least one first ratchet tooth with the tip of at least one second ratchet tooth during engagement. Thus, damage due to collision between the first ratchet tooth and the second ratchet tooth can be reduced.

In accordance with a thirteenth aspect of the present disclosure, the hub according to the twelfth aspect is configured so that one of the first anti-rotation portion and the second anti-rotation portion includes at least one convex portion and the other of the first anti-rotation portion and the second anti-rotation portion includes at least one concave portion.

With the hub according to the thirteenth aspect, the first anti-rotation portion and the second anti-rotation portion can be reliably and easily coupled together.

In accordance with a fourteenth aspect of the present disclosure, the hub according to the twelfth aspect or the thirteenth aspect is configured so that the slider has a first anti-rotation portion mating with a second anti-rotation portion of the first rotating body. The first anti-rotation portion and the second anti-rotation portion is configured to mate together so as to allow axial movement of the slider relative to the first rotating body in an axial direction with respect to the center axis. The at least one first ratchet tooth and the at least one second ratchet tooth are changed from disengaged to engaged while the slider rotates with the second ratchet member with respect to the first ratchet member in the circumferential direction with respect to the center axis.

With the hub according to the fourteenth aspect, the second ratchet member moves in an axial direction while rotating in a circumferential direction to minimize axially contact of the tip of the at least one first ratchet tooth with the tip of at least one second ratchet tooth during engagement. Thus, damage due to collision between the first ratchet tooth and the second ratchet tooth can be reduced.

In accordance with a fifteenth aspect of the present disclosure, the hub according to any one of the first aspect to the fourteenth aspect further comprises a biasing member disposed between the first rotating body and the slider. The biasing member biases the second ratchet member via the slider in the axial direction with respect to the center axis towards engagement with the first ratchet member.

With the hub according to the fifteenth aspect, the engagement between the at least one first ratchet tooth and at least one second ratchet tooth can be reliably and stably obtained.

In accordance with a sixteenth aspect of the present disclosure, a hub for a human-powered vehicle is provided that basically comprises a hub axle, a first rotating body, a second rotating body, a first ratchet member and a second ratchet member. The hub axle defines a center axis. The first rotating body is rotatably mounted on the hub axle to rotate around the center axis. The second rotating body is rotatably mounted on the hub axle to rotate around the center axis. The first ratchet member has at least one first ratchet tooth. The first ratchet member is coupled to the first rotating body to rotate with the first rotating body. The second ratchet member has at least one second ratchet tooth mating with the at least one first ratchet tooth. The second ratchet member is coupled to the second rotating body to rotate with the second rotating body. The at least one first ratchet tooth 60 and the at least one second ratchet tooth are configured to be changed from disengaged to engaged so as at least one tip of the least one first ratchet tooth and at least one tip of the least one second ratchet tooth approach each other in the axial direction with respect to the center axis while the first ratchet member and the second ratchet member rotate relative to each other in the circumferential direction with respect to the center axis.

With the hub according to the sixteenth aspect, at least one of the first ratchet member and the second ratchet member moves in an axial direction while rotating in a circumferential direction to minimize axially contact of at least one tip of the at least one first ratchet tooth with at least one tip of the at least one second ratchet tooth during engagement. Thus, damage due to collision between the first ratchet tooth and the second ratchet tooth can be reduced.

In accordance with a seventeenth aspect of the present disclosure, the hub according to any one of the first aspect to the sixteenth aspect is configured so that the at least one first ratchet tooth is disposed on a first axially facing surface of the first ratchet member. The at least one second ratchet tooth is disposed on a second axially facing surface of the second ratchet member that faces the first axially facing surface of the first ratchet member.

With the hub according to the seventeenth aspect, it is possible to provide firm engagement between the first ratchet member and the second ratchet member during the driving of the first rotating body by a torque inputted to the second rotating body.

In accordance with an eighteenth aspect of the present disclosure, the hub according to any one of the first aspect to the seventeenth aspect is configured so that the first ratchet member and second ratchet member are annular members arranged around the center axis.

With the hub according to the eighteenth aspect, it is possible to provide better engagement between the first ratchet member and second ratchet member.

In accordance with a nineteenth aspect of the present disclosure, the hub according to any one of the first aspect to the eighteenth aspect is configured so that the second rotating body has a first helical spline disposed on an outer peripheral surface of the second rotating body. The second ratchet member has a second helical spline mating with the first helical spline. The second ratchet member is movably mounted in an axial direction with respect to the second rotating body via the second helical spline in engagement with the first helical spline while the second ratchet member is being driven by a thrust force that is applied from the second rotating body.

With the hub according to the nineteenth aspect, the first ratchet member and second ratchet member can be reliably engaged and disengaged.

In accordance with a twentieth aspect of the present disclosure, the hub according to any one of the first aspect to the nineteenth aspect is configured so that the second rotating body is coupled to the first rotating body to rotate together in a driving rotational direction around the center axis, and the second rotating body is configured to rotate relative to the first rotating body in a non-driving rotational direction around the center axis.

With the hub according to the twentieth aspect, the second rotating body functions as freewheel with respect to the first rotating body that is rotatably supported on the hub axle.

In accordance with a twenty-first aspect of the present disclosure, the hub according to any one of the first aspect to the twentieth aspect is configured so that the first rotating body includes a hub body and the second rotating body includes a sprocket support body.

With the hub according to the twenty-first aspect, a sprocket can be mounted to the hub for driving the hub.

Also, other objects, features, aspects and advantages of the disclosed hub will become apparent to those skilled in the art from the following detailed description, which, taken in conjunction with the annexed drawings, discloses preferred embodiments of the hub.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
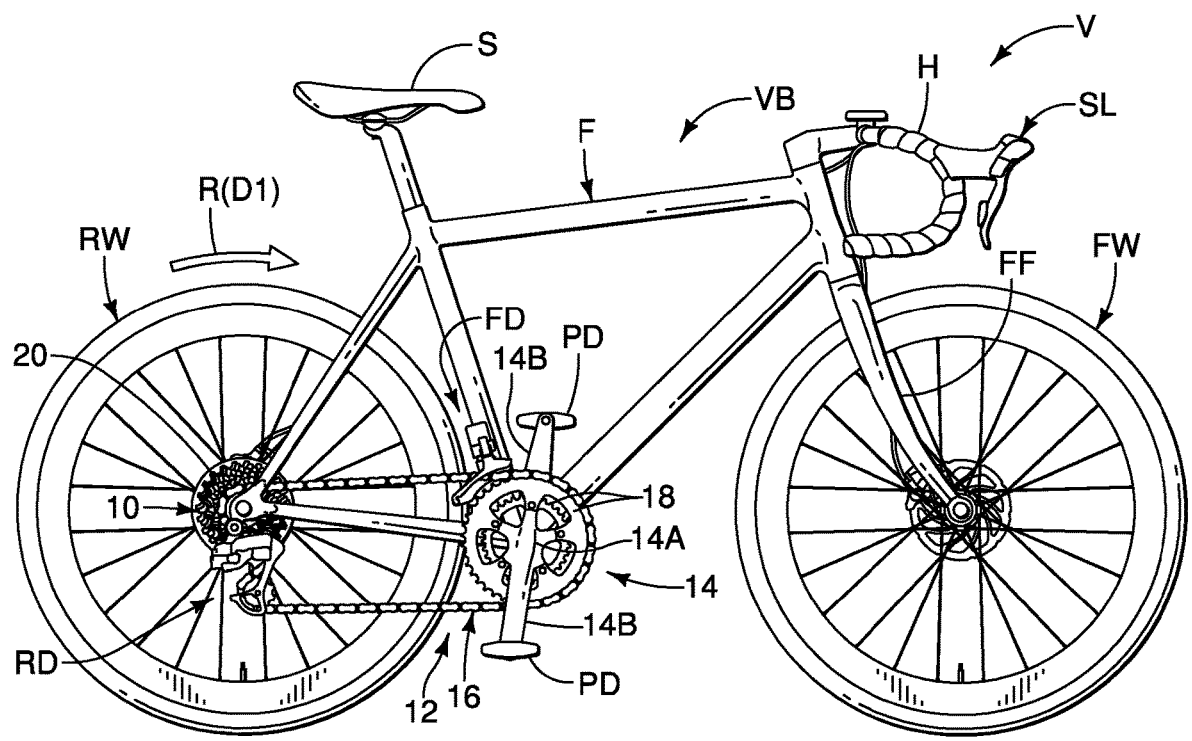
FIG. 1 is a side elevational view of a human-powered vehicle (e.g., a bicycle) equipped with a hub in accordance with a first embodiment.

Referring initially to FIG. 1, a human-powered vehicle V is illustrated that is equipped with a hub 10 in accordance with one illustrated embodiment. In other words, the hub 10 is provided for the human-powered vehicle V. In this embodiment, the human-powered vehicle V is a bicycle and the hub 10 is a bicycle hub. The human-powered vehicle V includes a front wheel FW and a rear wheel RW rotatably attached to a vehicle body VB. Here, the hub 10 is provided to the rear wheel RW. The vehicle body VB is also provided with a handlebar H and a front fork FF for steering the front wheel FW. The vehicle body VB is also provided with a saddle S for a rider to sit on while riding the human-powered vehicle V.

As seen in FIG. 1, the human-powered vehicle V further comprises a drive assembly 12. The drive assembly 12 comprises the hub 10. Here, for example, the drive assembly 12 is a chain-drive type. The drive assembly 12 further comprises a crank 14, a chain 16 (i.e., a force transmission member), a plurality of front sprockets 18 (i.e., a front rotatable body) and plurality of rear sprockets 20 (i.e., a rear rotatable body). The chain 16 provides mechanical communication between the crank 14 and the hub 10. Thus, a rotational force caused by rotation of the crank 14 in a forward traveling direction R can be transmitted to the hub 10 via the chain 16. The crank 14 includes a crank axle 14A and a pair of crank arms 14B. A pedal PD is rotatably coupled to the distal end of each of the crank arms 14B. The crank arms 14B are provided on opposite ends of the crank axle 14A. The chain 16 can provide a mechanical connection between the front sprockets 18 and the rear sprockets 20 provided on the hub 10.

Here, the human-powered vehicle V further includes a front derailleur FD that is attached to the vehicle body VB for shifting the chain 16 between the front sprockets 18 that are provided to the crank 14. Also, here, the human-powered vehicle V further includes a rear derailleur RD that is attached to the rear of the vehicle body VB for shifting the chain 16 between the rear sprockets 20 that are provided to the hub 10. The front derailleur FD and the rear derailleur RD are one type of gear changing device. Here, for example, the front derailleur FD and the rear derailleur RD are electric derailleurs (i.e., electric gear changing devices). The front derailleur FD and the rear derailleur RD are operated when a rider of the human-powered vehicle V manually operates a gear shift operating device or shifter SL. The front derailleur FD and the rear derailleur RD can also be automatically operated based on traveling conditions and/or operating conditions of the human-powered vehicle V.

The structure of the hub 10 will now be described with particular reference to FIGS. 2 and 3. The hub 10 comprises a hub axle 30 and a first rotating body 32. The hub axle 30 defines a center axis CA. The first rotating body 32 is rotatably mounted on the hub axle 30 to rotate around the center axis CA. The second rotating body 34 is rotatably mounted on the hub axle 30 to rotate around the center axis CA. As explained below, the second rotating body 34 is rotatably coupled to the hub axle 30 to transmit a driving force from the second rotating body 34 to the first rotating body 32 while the second rotating body 34 rotates in a driving rotational direction D1 as explained later. Basically, the hub axle 30 is non-rotatably attached to the vehicle body VB, while the first rotating body 32 is rotatably mounted around the hub axle 30. As indicated in FIG. 1, the first rotating body 32 and the second rotating body 34 are rotatable relative to the hub axle 30 in the driving rotational direction D1 which corresponds to a forward traveling direction R of the rear wheel RW. Here, the first rotating body 32 includes a hub body HB. Also, here, the second rotating body 34 includes a sprocket support body SB. Thus, the second rotating body 34 is configured to support the rear sprockets 20.

The hub axle 30 is a rigid member that is made of a suitable material such as a metal material. Here, the hub axle 30 is a conventional member having a shaft portion 30a with a first end cap 30b provided on a first end of the shaft portion 30a and a second end cap 30c provided on a second end of the shaft portion 30a. Here, the shaft portion 30a, the first end cap 30b and the second end cap 30c define a through bore as seen in FIG. 3. As seen in FIG. 2, a frame securing device 36 is provided for attaching the hub 10 to the bicycle frame F (see FIG. 1) in a conventional manner. In the first embodiment, the frame securing device 36 includes a skewer or spindle 36a that has a cam lever mechanism 36b mounted at one end of the spindle 36a. Thus, the hub 10 can be mounted onto a rear section of the vehicle body VB of the human-powered vehicle V as seen in FIG. 1.

Figure 2:
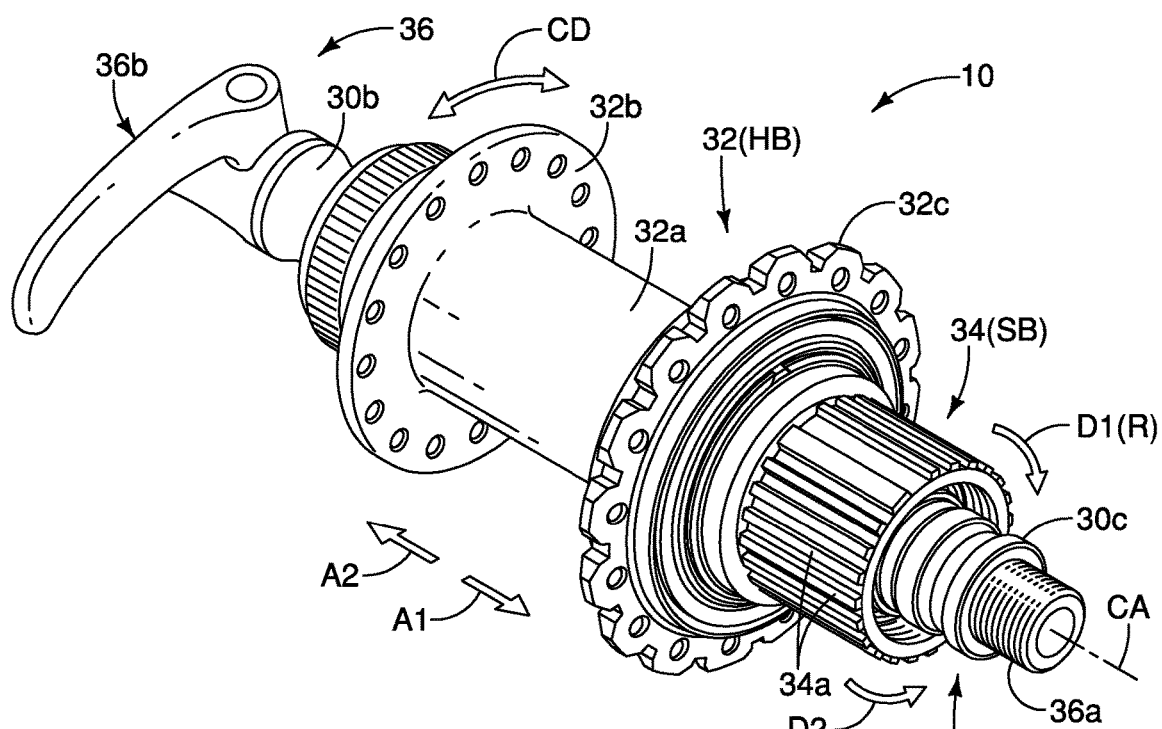
FIG. 2 is a perspective view of the hub of the human-powered vehicle illustrated in FIG. 1.

As shown in FIG. 2, the first rotating body 32 is rotatably mounted on the hub axle 30 to rotate around the center axis CA. The first rotating body 32 is a rigid member that is made of a suitable material such as a metal material or a reinforced plastic material. The first rotating body 32 includes a spoke attachment structure for attaching the spokes of the rear wheel RW to the hub 10. In particular, the first rotating body 32 has a center tubular body 32a and a pair of spoke attachment flanges 32b and 32c extending outwardly in a radial direction from the center tubular body 32a. The spoke attachment flanges 32b and 32c are provided with holes for attaching the inner ends of the spokes in a conventional manner. Thus, the spoke attachment flanges 32b and 32c form a spoke attachment structure.

Figure 3:
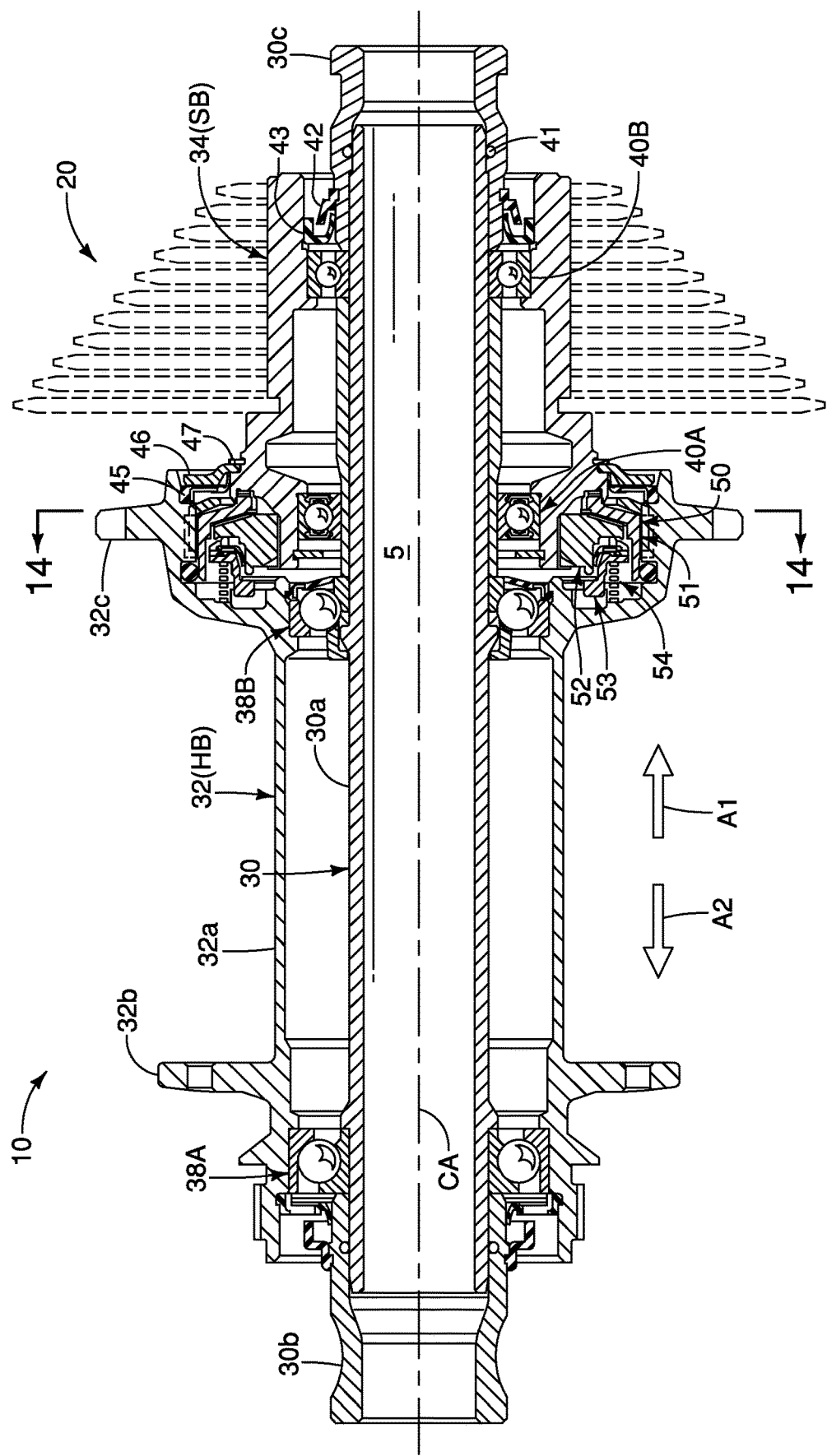
FIG. 3 is a longitudinal cross sectional view of the hub illustrated in FIG. 2 with the frame securing device omitted.

As shown in FIG. 3, the hub 10 further comprises at least one bearing assembly for rotatably supporting the first rotating body 32 on the hub axle 30. In the illustrated embodiment, the first rotating body 32 is rotatably mounted on the hub axle 30 by a pair of bearing assemblies 38A and 38B. The bearing assemblies 38A and 38B are conventional parts that are well known in the bicycle field, and thus, the bearing assemblies 38A and 38B will not be discussed any or illustrated in detail herein. Also, other bearing arrangements can be used as needed and/or desired.

The second rotating body 34 is rotatably mounted on the hub axle 30 to rotate around the center axis CA. The second rotating body 34 is coupled to the first rotating body 32 to rotate together in a driving rotational direction D1 around the center axis CA. In particular, the second rotating body 34 is rotatably coupled to the hub axle 30 to transmit a driving force from the second rotating body 34 to the first rotating body 32 while the second rotating body 34 rotates in the driving rotational direction D1 as explained later. Thus, the second rotating body 34 constitutes a driving member that has a tubular shape. Also, the second rotating body 34 is configured to rotate relative to the first rotating body 32 in a non-driving rotational direction D2 around the center axis CA.

The second rotating body 34 is configured to support the rear sprockets 20. Thus, the second rotating body 34 includes a sprocket attachment structure. For example, here, the second rotating body 34 has an outer peripheral surface that is provided with a plurality of axially extending splines 34a (FIG. 2) for non-rotatably engaging the rear sprockets 20 (FIGS. 1 and 3) in a conventional manner. The splines 34a are parallel to each other, and extend parallel to the center axis CA. The rear sprockets 20 (FIG. 1) are held on the second rotating body 34 in a conventional manner such as a conventional nut that screws into the second rotating body 34. The second rotating body 34 has a first helical spline 34b disposed on an outer peripheral surface of the second rotating body 34. In particular, the outer peripheral surface of the second rotating body 34 has a plurality of the first helical spline 34b. As explained later, the first helical spline 34b aid in the disengagement of the second rotating body 34 from the first rotating body 32 during coasting or when the second rotating body 34 is rotating in the non-driving rotational direction D2.

Referring to FIG. 3, the hub 10 further comprises at least one bearing assembly for rotatably supporting the second rotating body 34 on the hub axle 30. In the illustrated embodiment, the second rotating body 34 is rotatably coupled to the hub axle 30 by a pair of bearing assemblies 40A and 40B as seen in FIG. 3. The second rotating body 34 is axially retained on the hub axle 30 by the second end cap 30c. The second end cap 30c can be press-fitted or screwed onto the shaft portion 30a of the hub axle 30 to contact an inner race of the bearing assembly 40B. An O-ring 41 is provided between the second end cap 30c and the hub axle 30 for sealing the interface therebetween.

Figure 4:
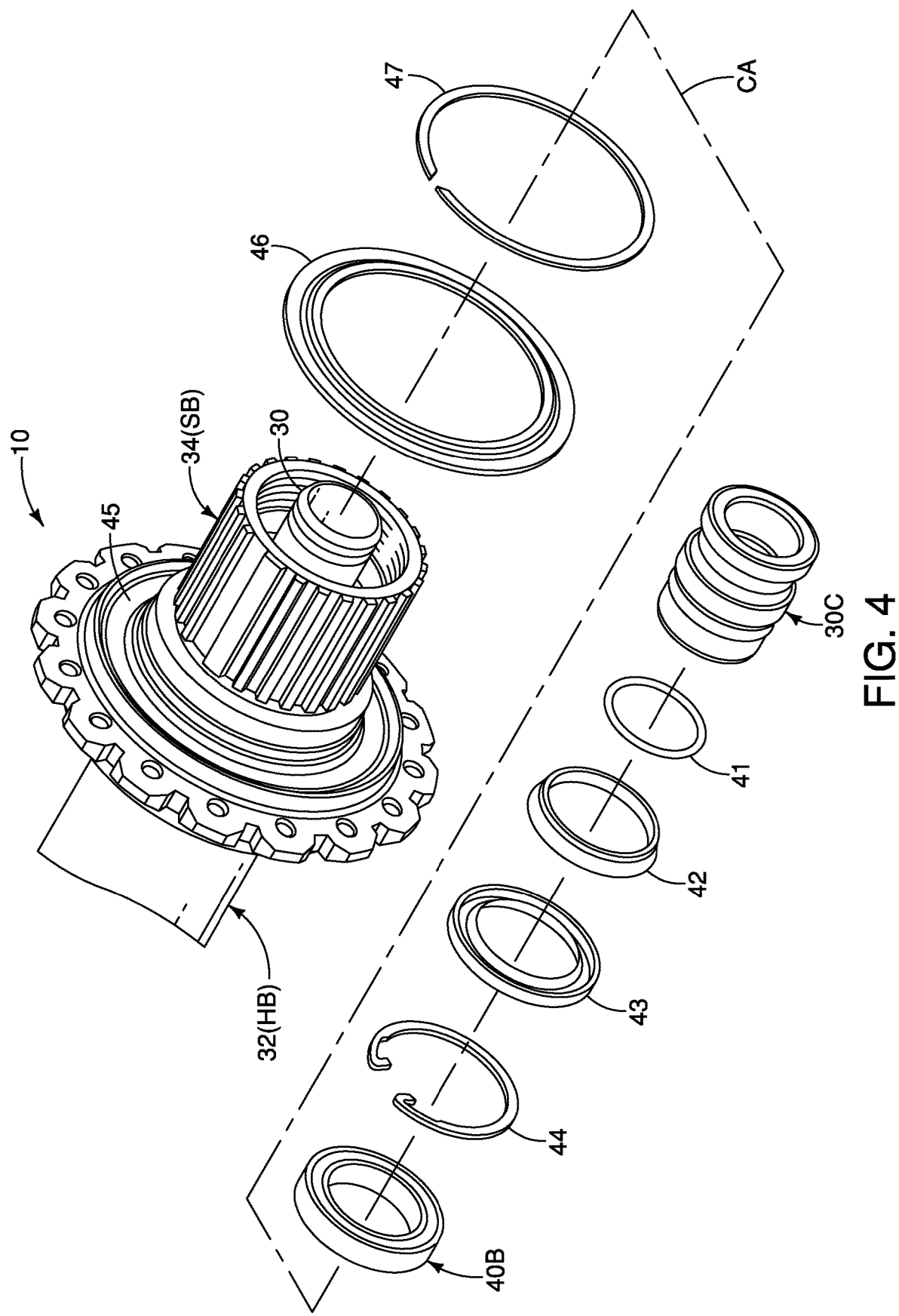
FIG. 4 is a partly exploded perspective view of selected parts of the hub illustrated in FIGS. 2 and 3.

Also, as seen in FIGS. 3 and 4, the hub 10 further comprises a first sealing ring 42 and a second sealing ring 43 for sealing the space between the exterior of the second end cap 30c and the interior of the second rotating body 34. The first sealing ring 42 is provided to the exterior of the second end cap 30c. The second sealing ring 43 is provided to the interior of the second rotating body 34. The hub 10 further comprises a retaining clip 44 for restricting axial movement of the outer race of the bearing assembly 40B.

Figure 14:
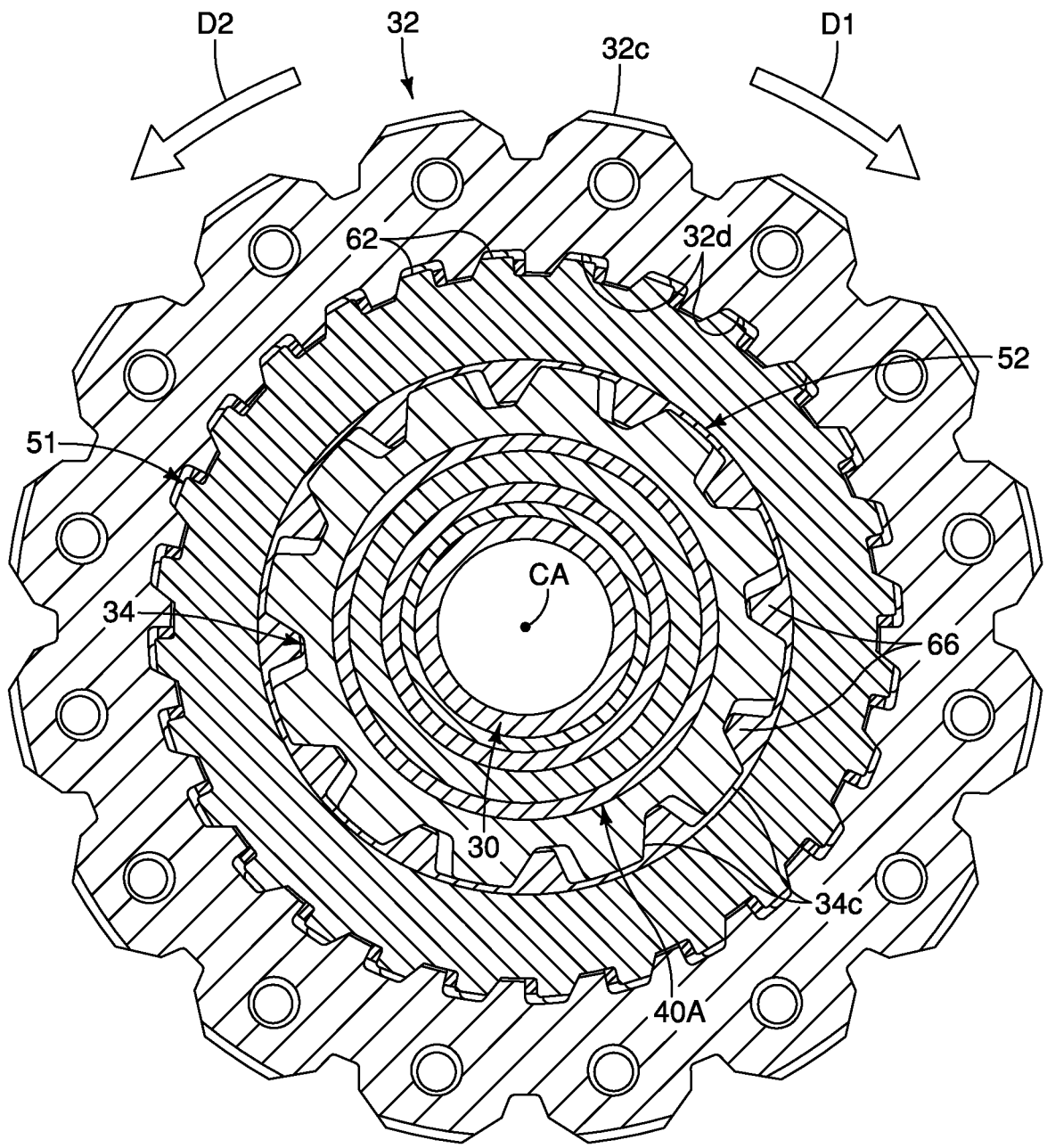
FIG. 14 is a transverse cross sectional view of the hub illustrated in FIGS. 2 and 3 as seen along section line 14-14 of FIG. 3.
Figure 15:
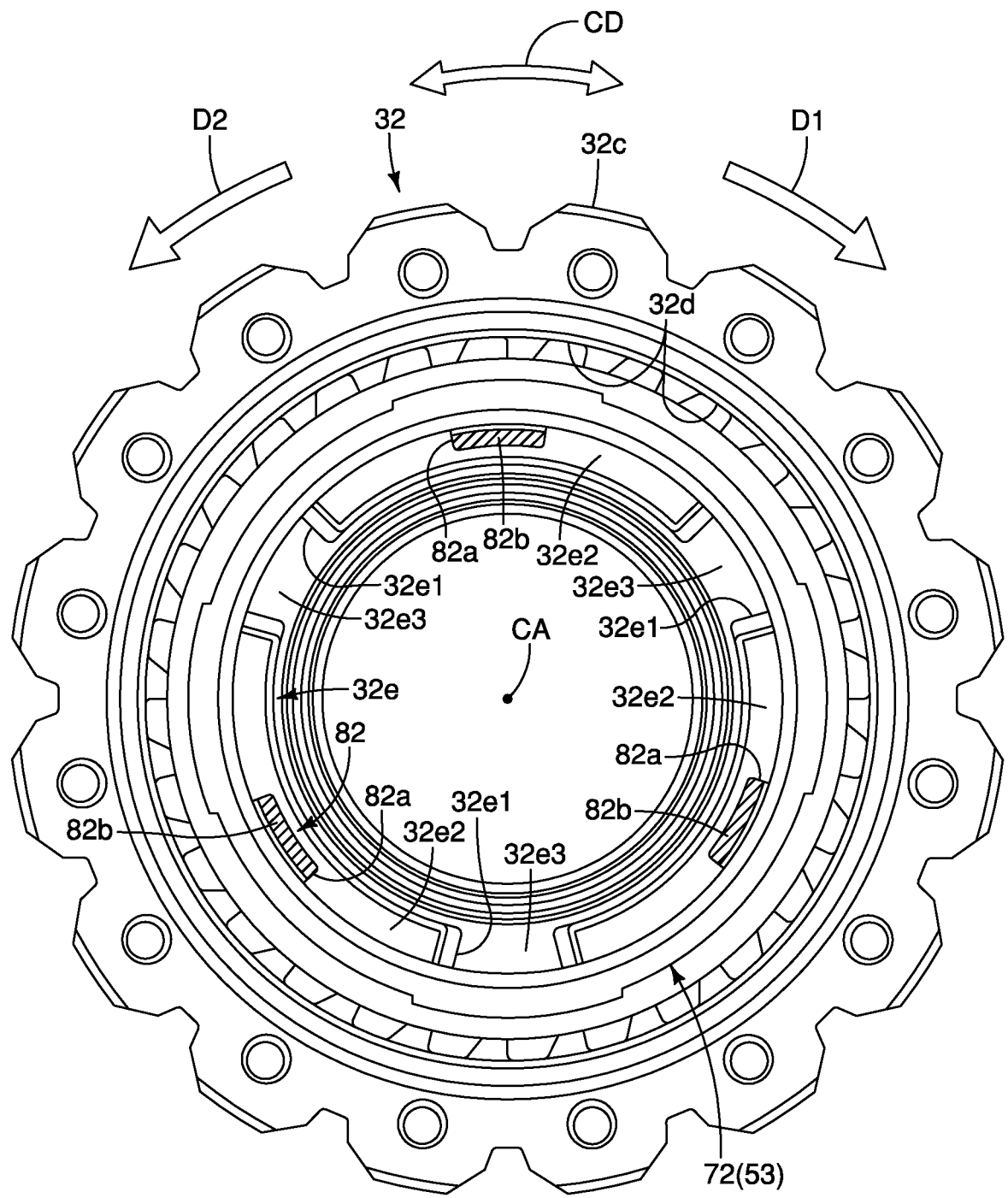
FIG. 15 is an end elevational view of the first rotating body and the slider of the hub illustrated in FIGS. 2 and 3 in which the slider is in a non-driving position with respect to the first rotating body.
Figure 16:
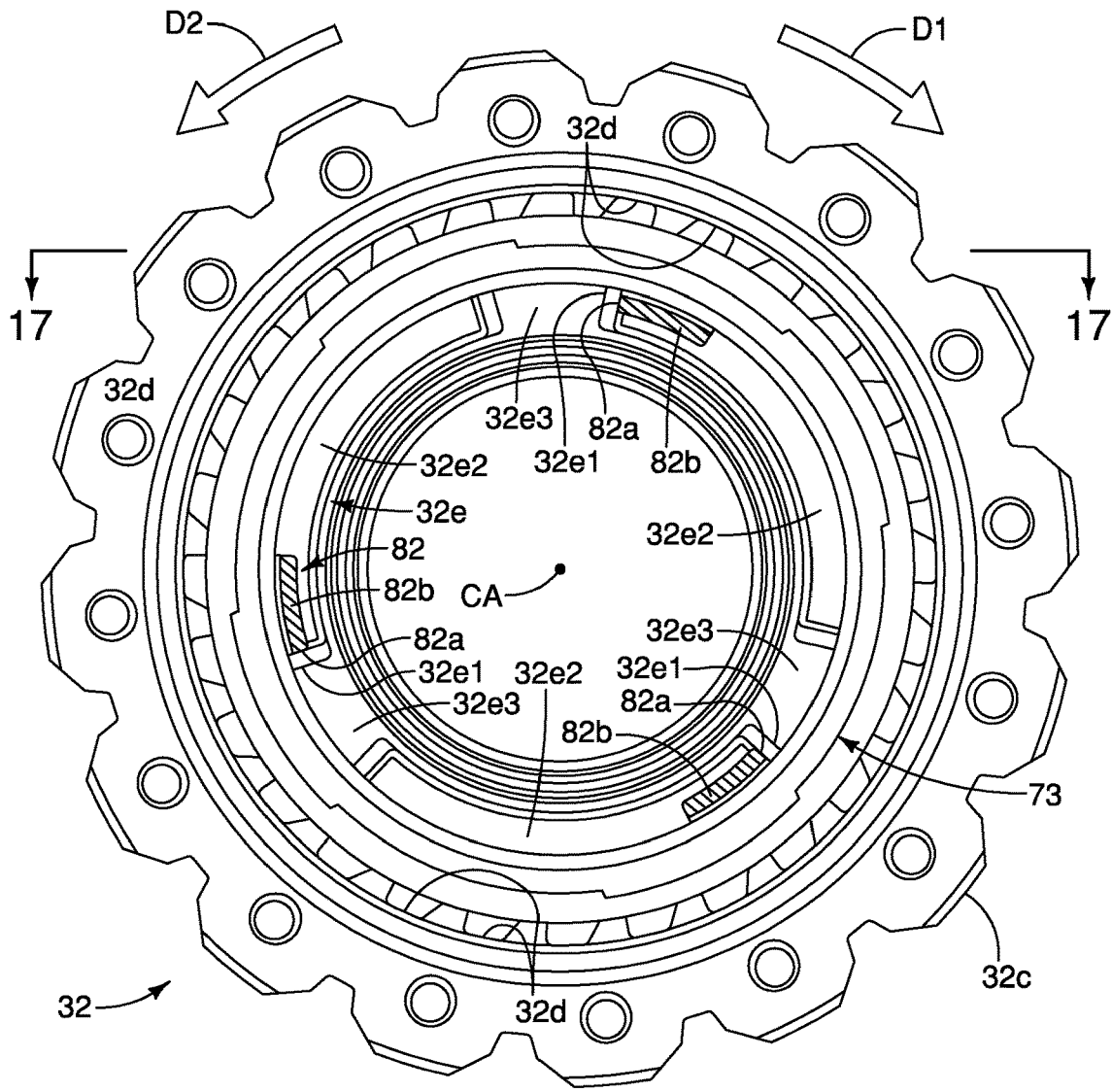
FIG. 16 is an end elevational view, similar to FIG. 15, of the first rotating body and the slider of the hub illustrated in FIGS. 2 and 3 in which the slider is in circumferential contact with the first rotating body.
Figure 17:
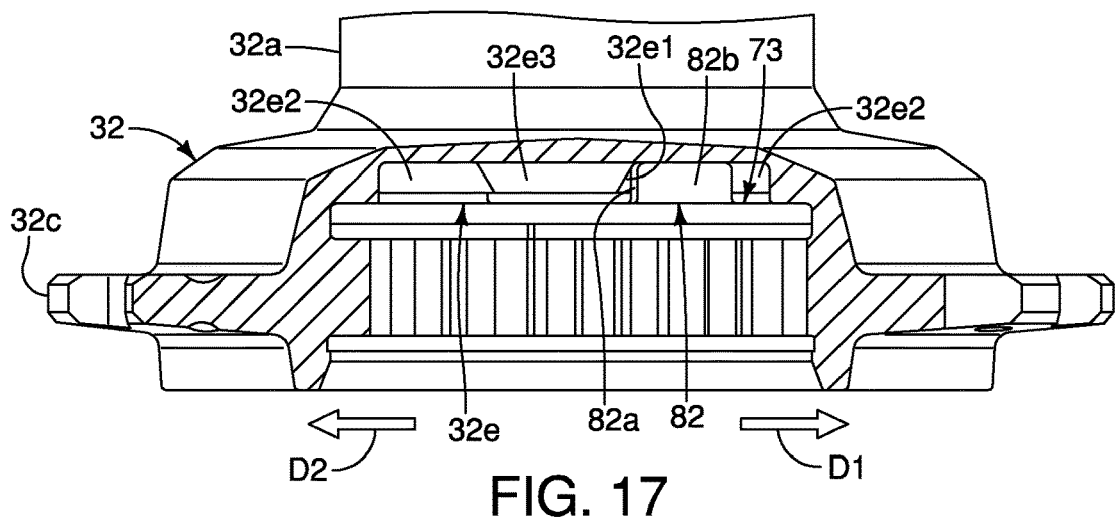
FIG. 17 is a partial cross sectional view of the first rotating body as seen along section line 17-17 of FIG. 16 in which the slider is in circumferential contact with the first rotating body.
Figure 18:
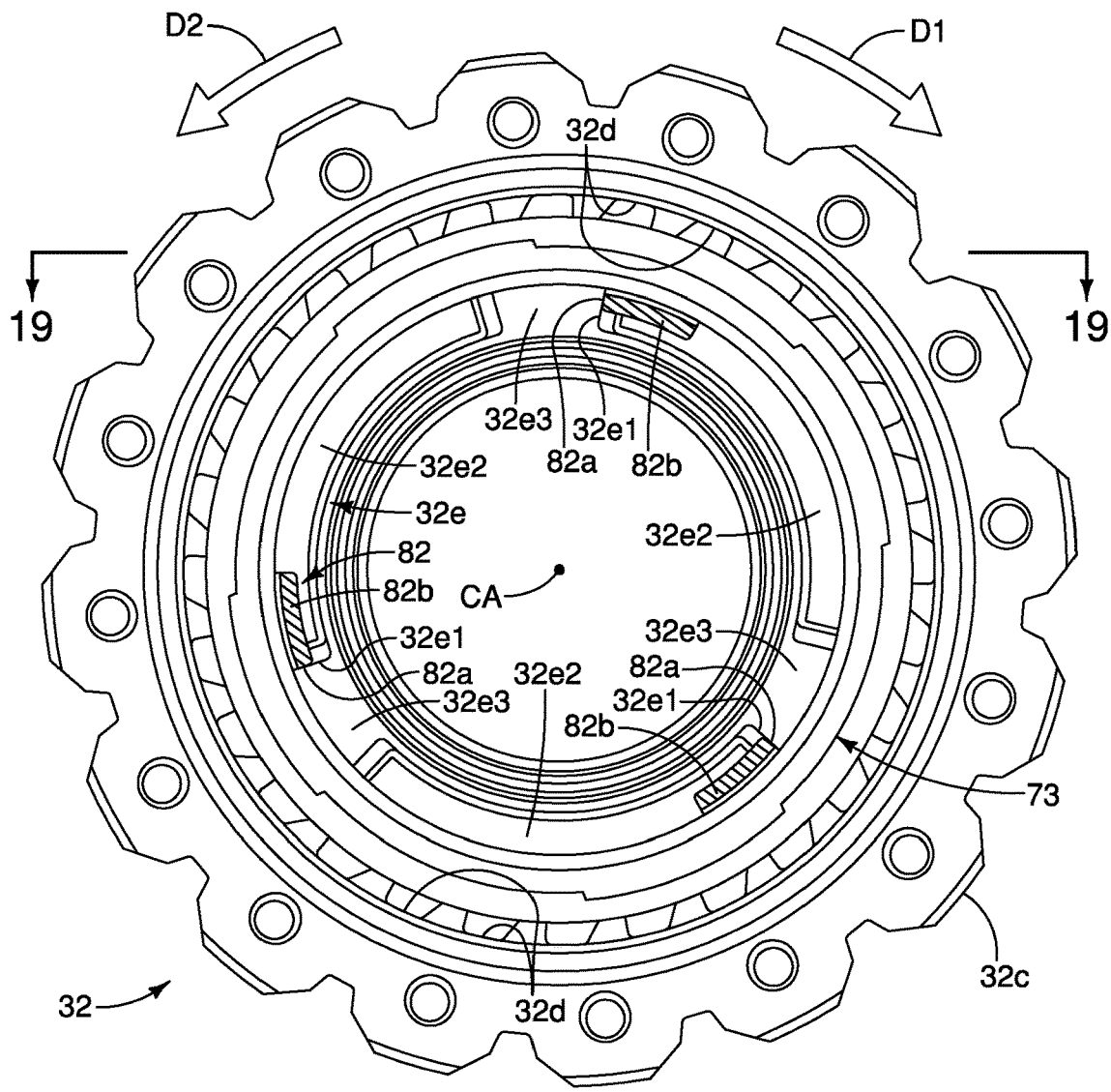
FIG. 18 is an end elevational view, similar to FIG. 15, of the first rotating body and the slider of the hub illustrated in FIGS. 2 and 3 in which the slider is moved axial due to the circumferential contact with the first rotating body.
Figure 19:
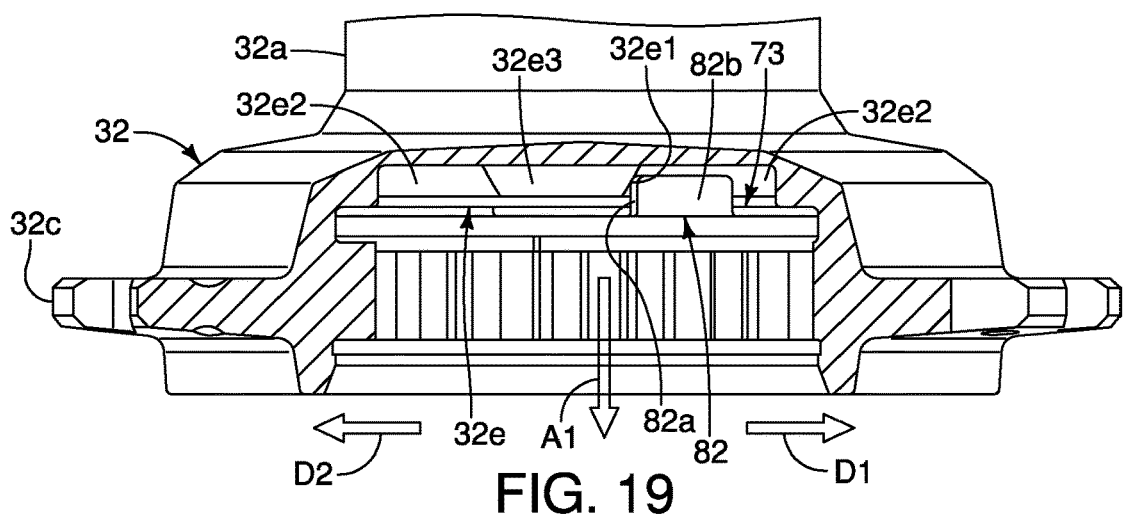
FIG. 19 is a partial cross sectional view, similar to FIG. 17, of the first rotating body as seen along section line 19-19 of FIG. 18 in which the slider is moved axial due to the circumferential contact with the first rotating body.

Still referring to FIGS. 3, 4 and 14, the hub 10 further includes a dust shield 45 for covering annular gap between the first rotating body 32 and the second rotating body 34. In particular, the dust shield 45 covers the annular gap the space between the interior of the first rotating body 32 and the exterior of the second rotating body 34. The hub 10 further comprises an outer cap 46 and a retaining clip 47 for retaining the dust shield 45 in place between the first rotating body 32 and the second rotating body 34. The outer cap 46 is provided to the exterior of the second rotating body 34 and disposed between the first rotating body 32 and the second rotating body 34. The retaining clip 47 is provided in a recess of the exterior of the second rotating body 34 for restricting axial movement of the outer cap 46 in which in turn restricts axial movement of the dust shield 45.

The hub 10 further comprises a planar ratchet assembly 50 that is configured to transmit a driving force from the second rotating body 34 to the first rotating body 32 while the second rotating body 34 rotates in the driving rotational direction D1. In other words, the second rotating body 34 is rotatably coupled to the hub axle 30 via the planar ratchet assembly 50 to transmit a driving force from the second rotating body 34 to the first rotating body 32 while the second rotating body 34 rotates in the driving rotational direction D1.

The planar ratchet assembly 50 functions as a one-way clutch between the first rotating body 32 and the second rotating body 34 to permit coasting or freewheeling of the second rotating body 34 with respect to the first rotating body 32. In particular, coasting or freewheeling occurs when the second rotating body 34 is stopped from rotating in the driving rotational direction D1 (i.e., clockwise about the center axis CA as viewed from the freewheel side of the hub 10) by the chain 16, while the first rotating body 32 rotates in the forward traveling direction R. Additionally, coasting or freewheeling occurs when the first rotating body 32 rotates faster in the forward traveling direction R than the second rotating body 34 rotates in the driving rotational direction D1 by the chain 16. Also, coasting or freewheeling occurs when the second rotating body 34 rotates in a non-driving direction D2 by the chain 16 due to the rider pedaling backwards.

In the first embodiment, the hub 10 further comprises a first ratchet member 51 and a second ratchet member 52. The first ratchet member 51 and the second ratchet member 52 are part of the planar ratchet assembly 50. The first ratchet member 51 and second ratchet member 52 are annular members arranged around the center axis CA. The first ratchet member 51 is coupled to the first rotating body 32 to rotate with the first rotating body 32. The second ratchet member 52 is coupled to the second rotating body 34 to rotate with the second rotating body 34. The hub 10 further comprises a slider 53. The slider 53 is configured to rotate with the first rotating body 32 and to slide with respect to the second rotating body 34 in a circumferential direction CD with respect to the center axis CA.

The hub 10 further comprises a biasing member 54. The biasing member 54 is disposed between the first rotating body 32 and the slider 53. Basically, the biasing member 54 biases the second ratchet member 52 via the slider 53 in an axial direction with respect to the center axis CA towards engagement with the first ratchet member 51. Here, the biasing member 54 biases the second ratchet member 52 in a first axial direction A1 toward the first ratchet member 51 into the engagement position. With the second rotating body 34 in a rest position (i.e., no torque being applied thereto), the biasing member 54 maintains the second ratchet member 52 in driving engagement with the first ratchet member 51. The biasing member 54 includes, for example, a compression spring in the illustrated embodiment. Here, the first axial direction A1 refers to a direction that is parallel to the center axis CA and that points in a direction towards the end of the hub axle 30 having the second rotating body 34.

Figure 12:
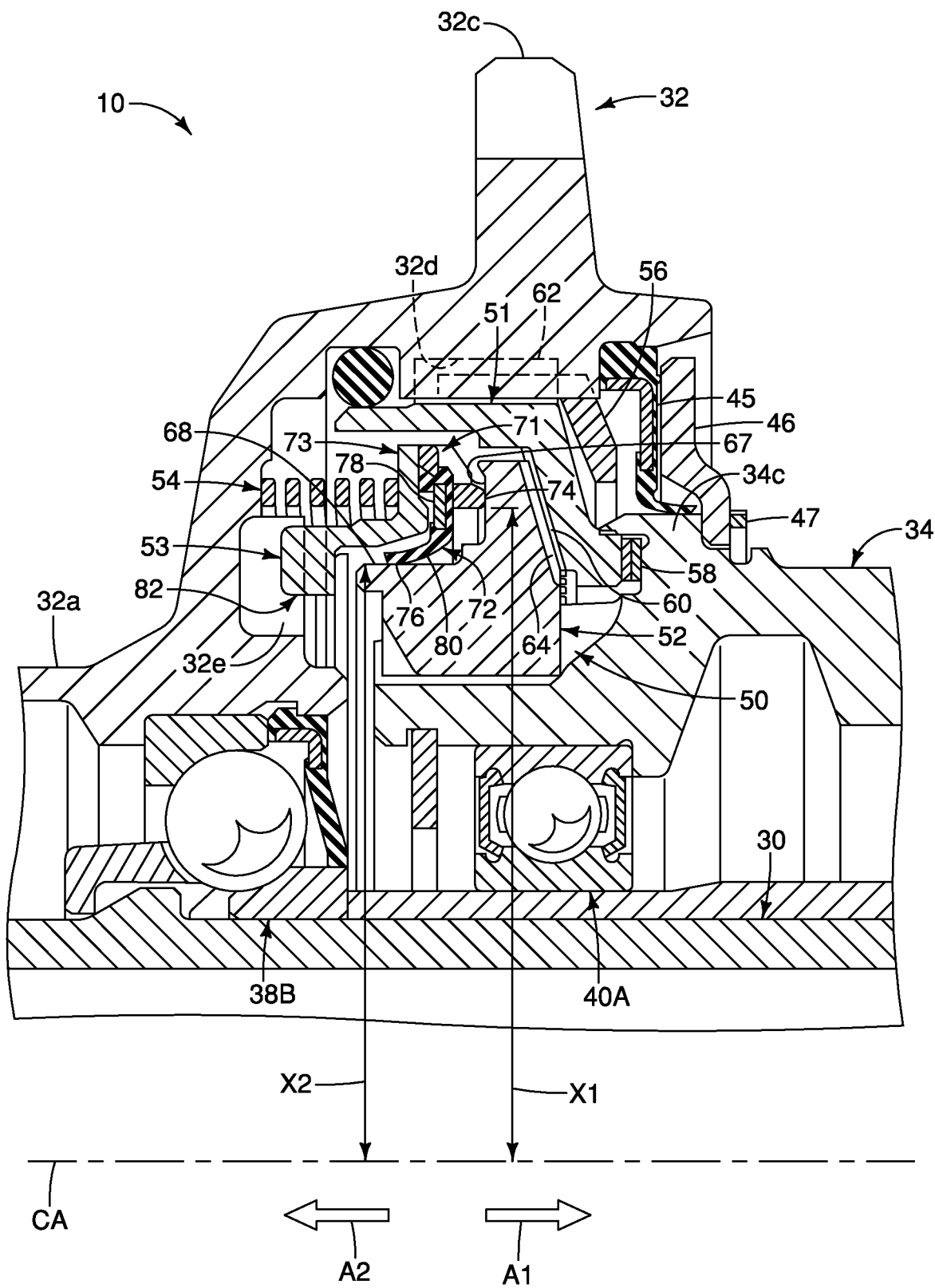
FIG. 12 is an enlarged cross sectional view of a portion of the hub illustrated in FIGS. 2 and 3 in which the first ratchet member and the second ratchet member of the planar ratchet assembly are in an engaged position for driving a first rotating body (i.e., the hub body) of the hub.
Figure 13:
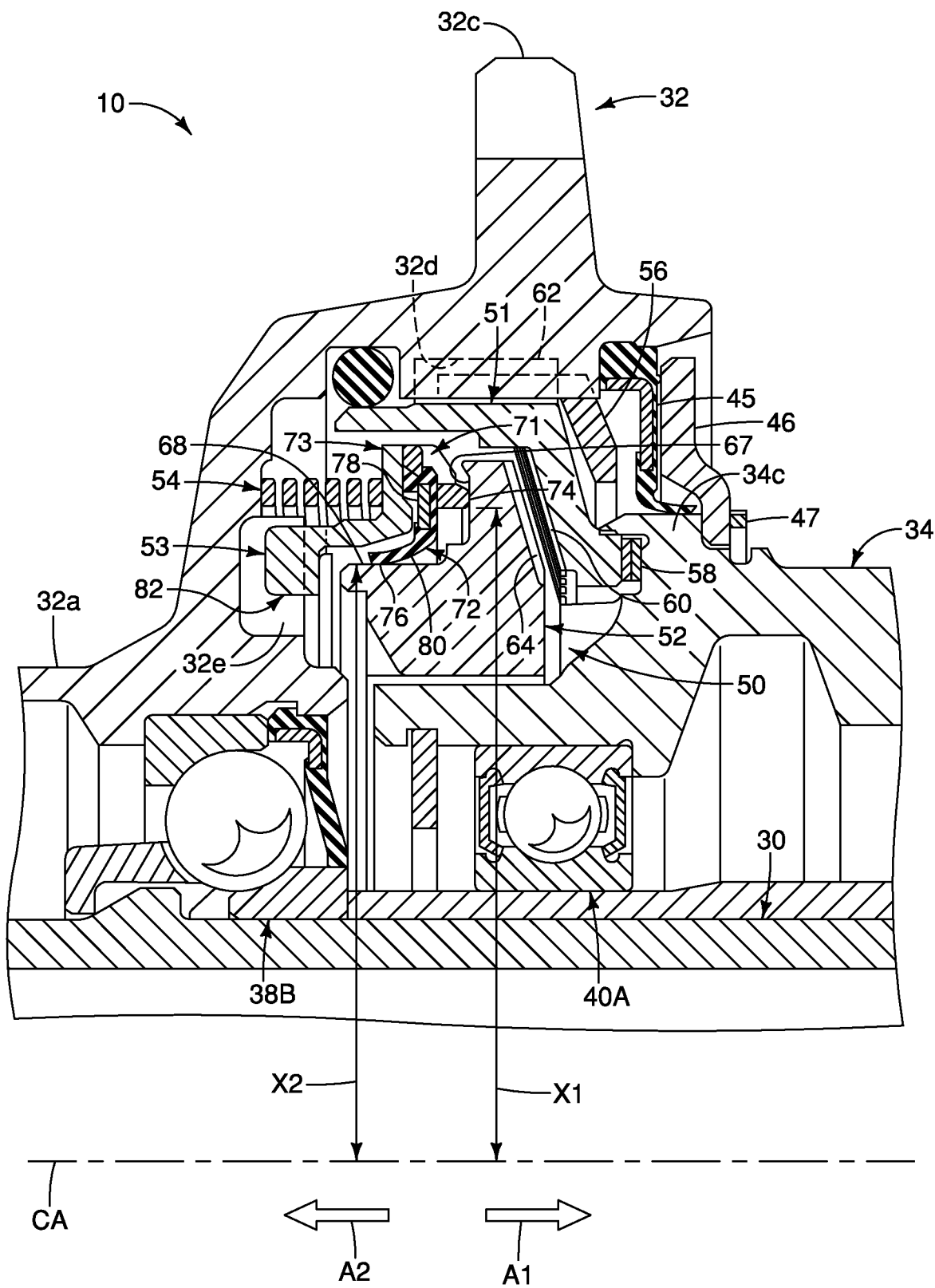
FIG. 13 is an enlarged cross sectional view, similar to FIG. 12, of the portion of the hub illustrated in FIGS. 2 and 3 but in which the first ratchet member and the second ratchet member are in a disengaged position for coasting.

The first ratchet member 51 and the second ratchet member 52 move relative to each other in the axial direction as shown in FIG. 13. In particular, the second ratchet member 52 is biased in the first axial direction A1 towards the first ratchet member 51 into an engaged position by the biasing member 54 as seen in FIG. 12. During coasting, the second rotating body 34 stops rotating in the driving rotational direction D1 and the first rotating body 32 continues to rotate in the forward traveling direction R (see FIG. 1). As a result of the second rotating body 34 stop rotating in the driving rotational direction D1, the second ratchet member 52 is moved in a second axial direction A2 away from the first ratchet member 51 against the force of the biasing member 54. Here, the second axial direction A2 refers to a direction that is parallel to the center axis CA to the hub axle 30 and that points in a direction away from the end of the hub axle 30 having the second rotating body 34. The first axial direction A1 is opposite to the second axial direction A2. In this way, the first ratchet member 51 and the second ratchet member 52 can slide relative to each other as seen in FIG. 13.

The hub 10 further includes a circumferential spacer 56 and an axial spacer 58. The circumferential spacer 56 is disposed between the first rotating body 32 and the first ratchet member 51 to take up the circumferential space between the first ratchet member 51 and the first rotating body 32. The axial spacer 58 is disposed between the second rotating body 34 and the first ratchet member 51 to take up the axial space between the second rotating body 34 and the first ratchet member 51. Here, the axial spacer 58 includes a pair of annular washers as seen in FIG. 12.

Figure 6:
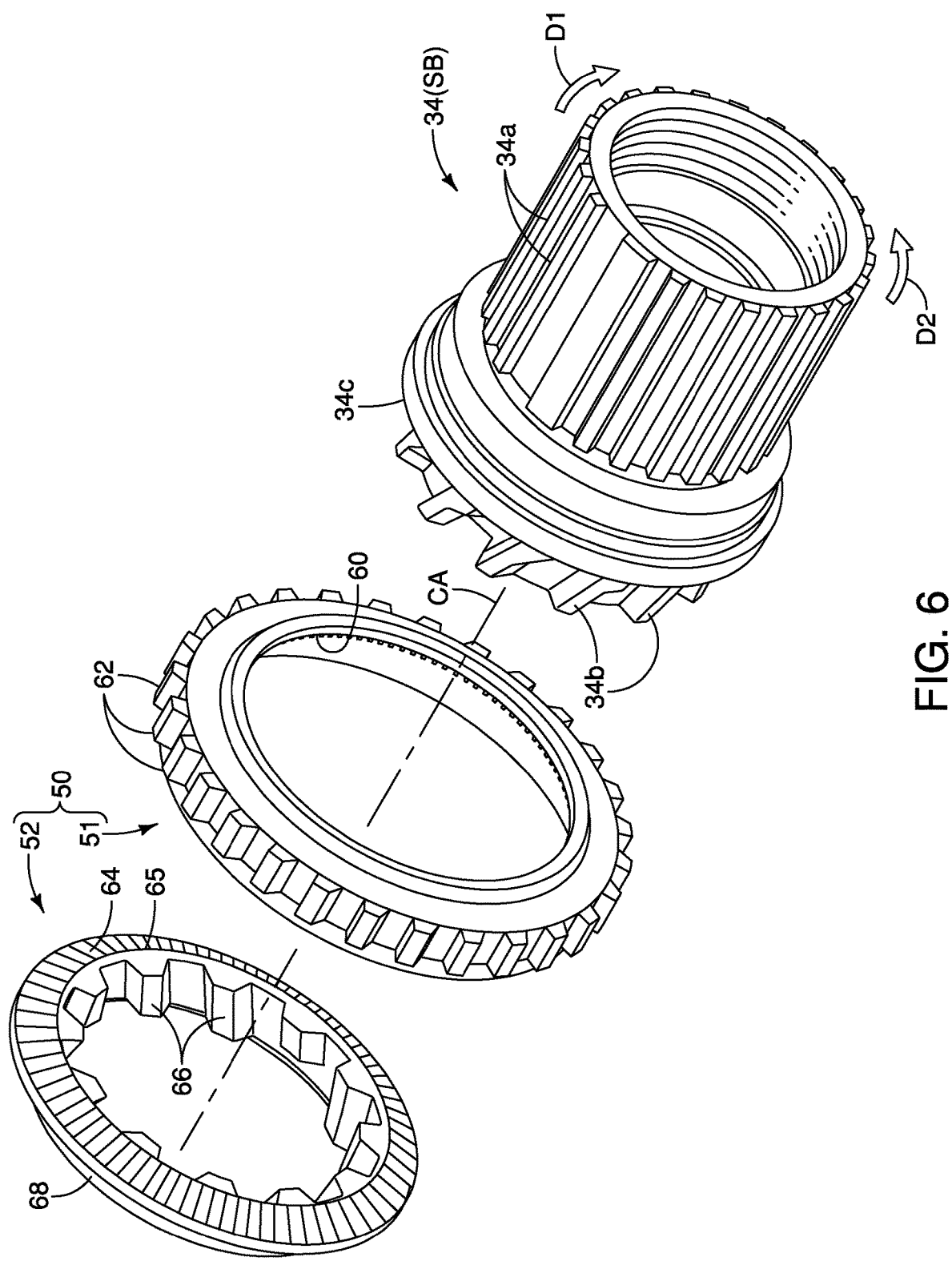
FIG. 6 is a perspective view of a second rotating body (i.e., the sprocket support body), a first ratchet member, and a second ratchet member of the hub illustrated in FIGS. 2 and 3.
Figure 7:
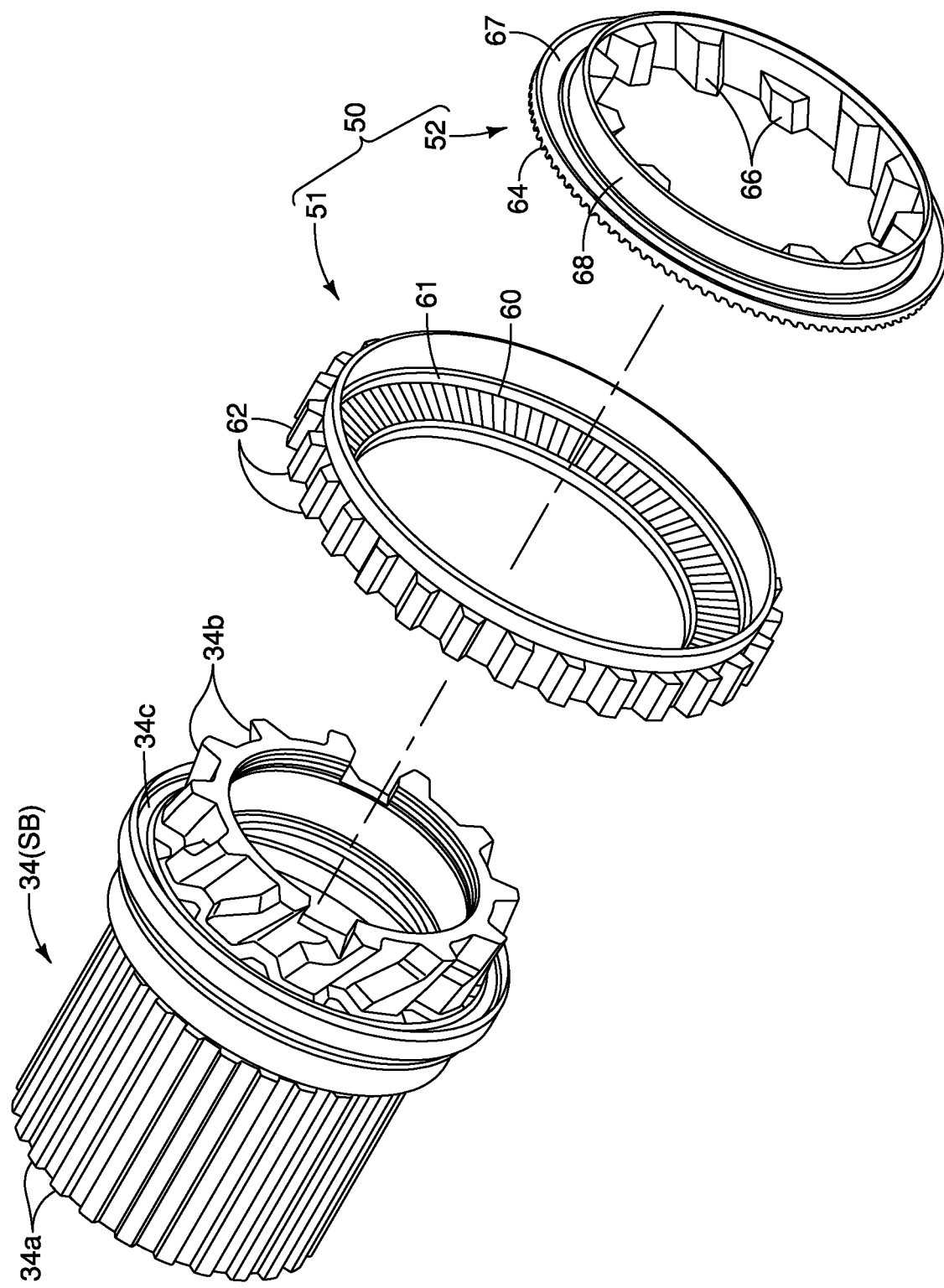
FIG. 7 is another perspective view of the second rotating body, the first ratchet member, and the second ratchet member illustrated in FIG. 6.
Figure 9:
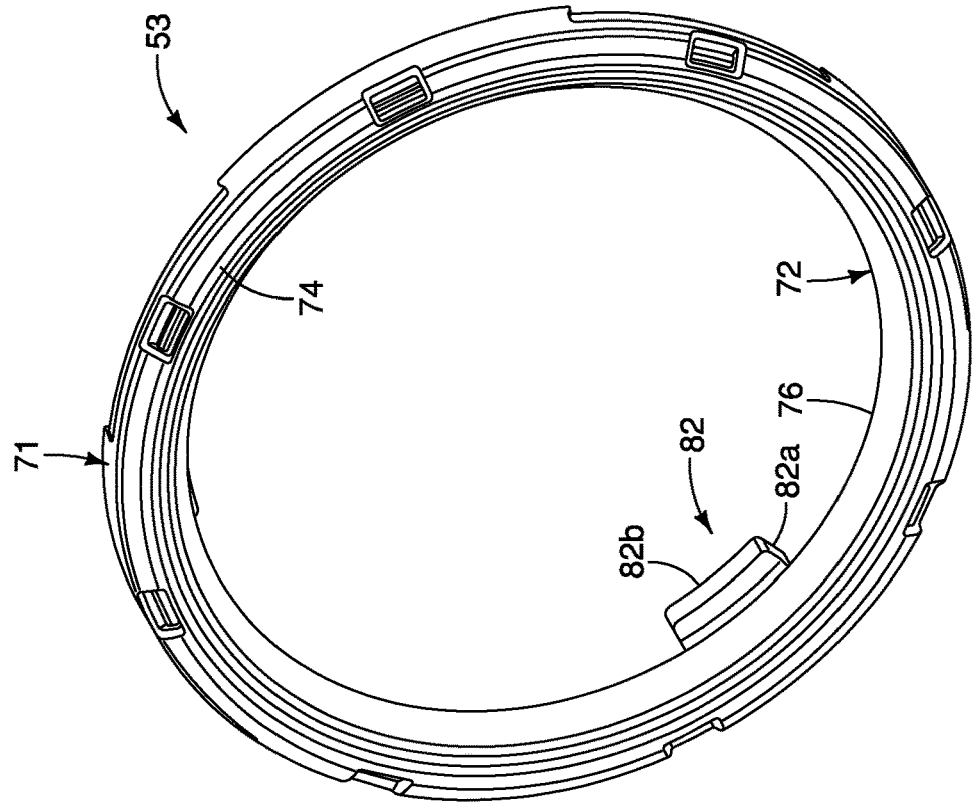
FIG. 9 is another enlarged perspective view of the slider illustrated in FIG. 8.
Figure 8:
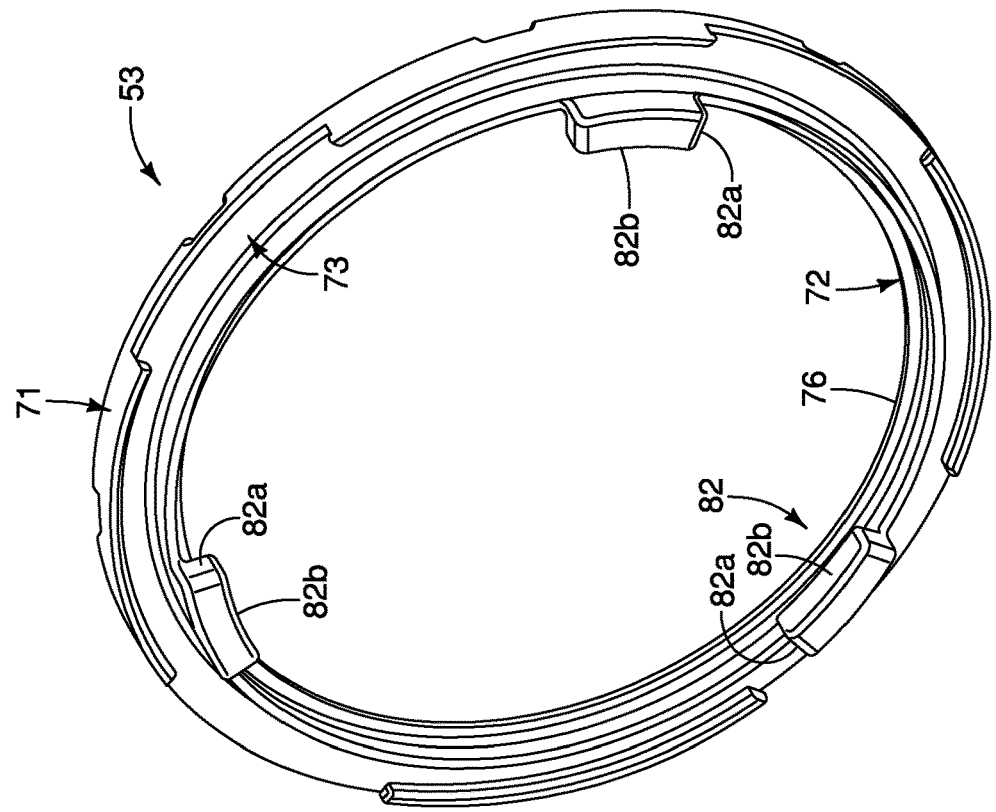
FIG. 8 is an enlarged perspective view of a slider of the hub illustrated in FIGS. 2 and 3.
Figure 10:
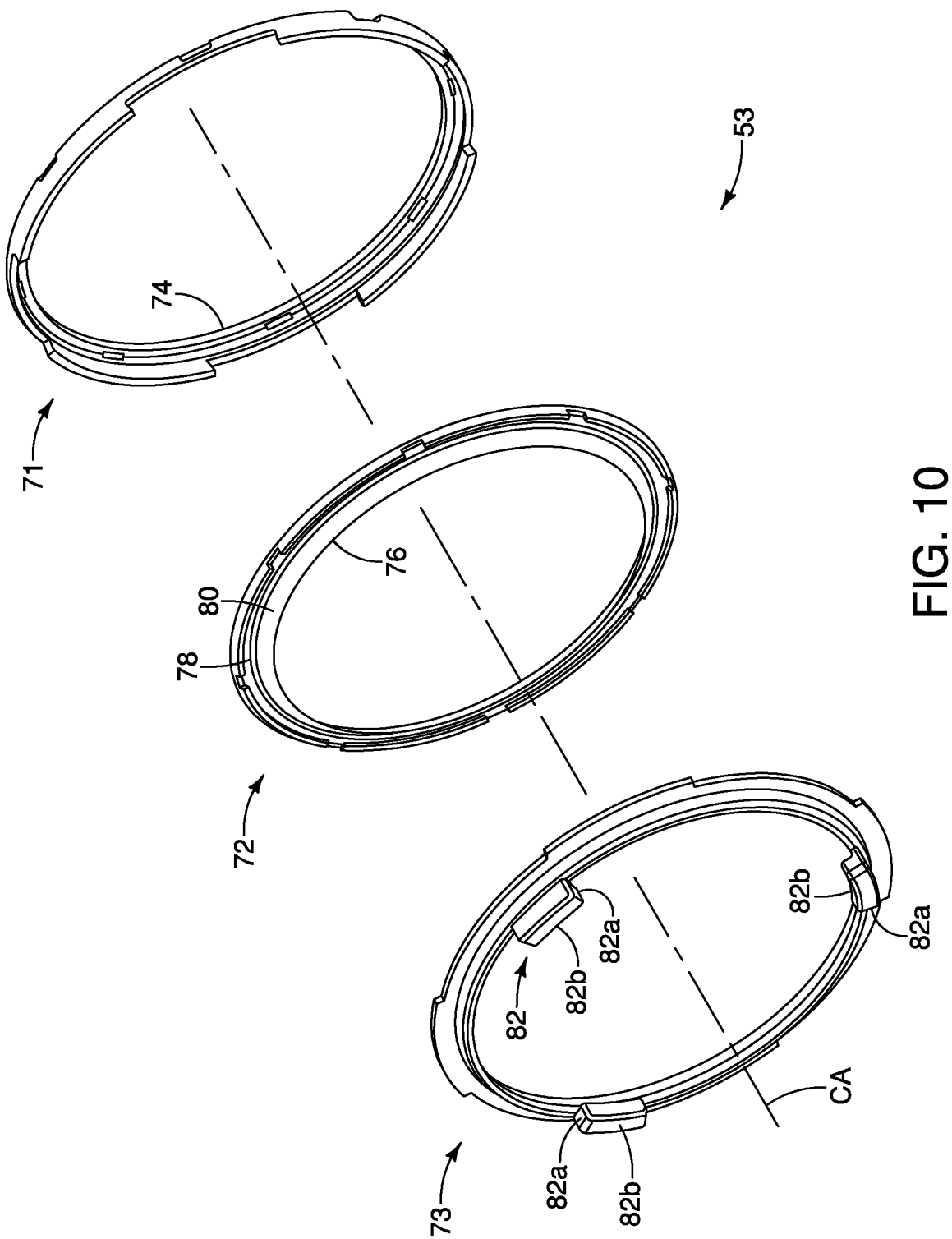
FIG. 10 is an exploded perspective view of the slider illustrated in FIGS. 8 and 9.
Figure 11:
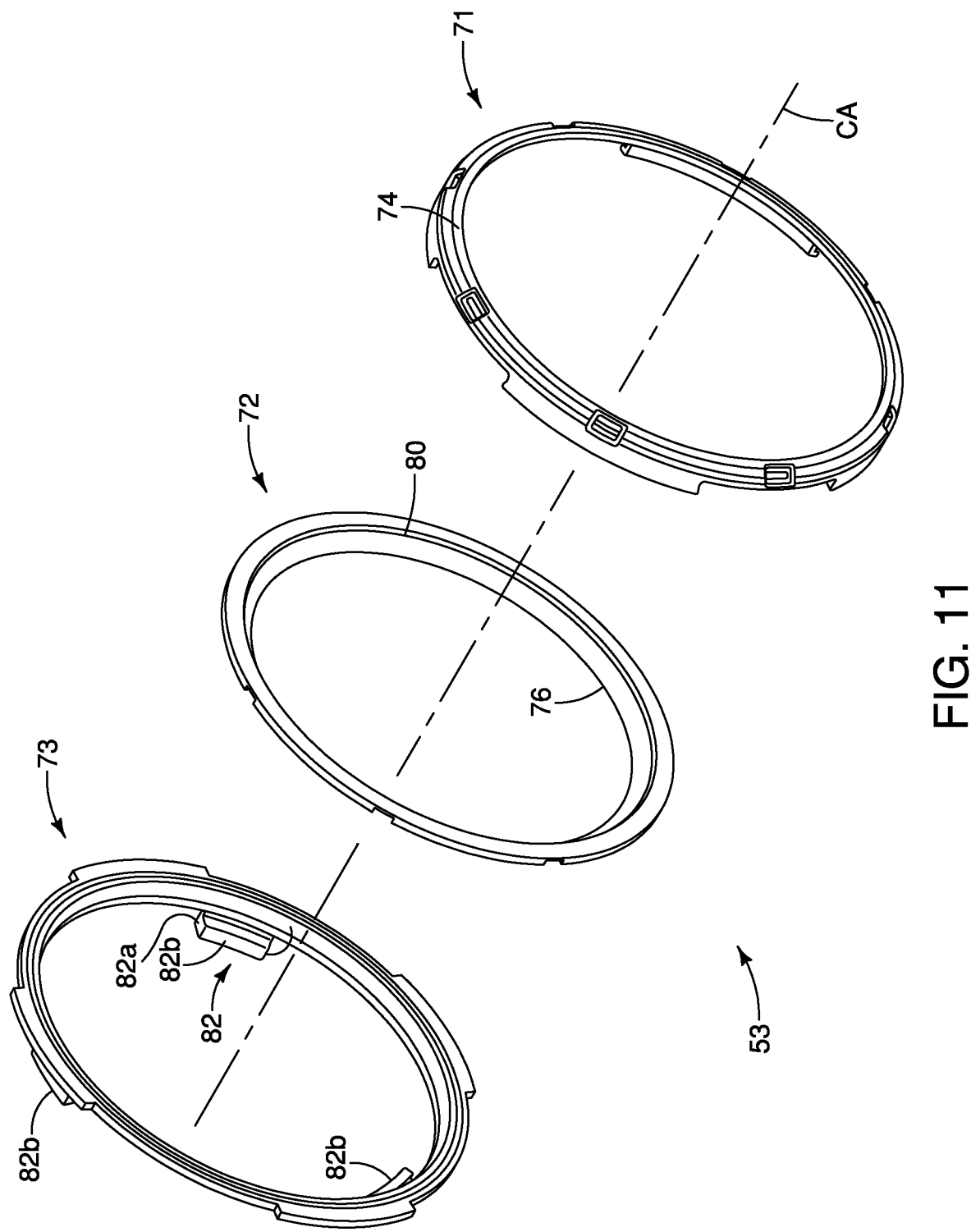
FIG. 11 is another exploded perspective view of the slider illustrated in FIGS. 8 to 10.

Referring to FIGS. 6, 7, 12 and 13, the first ratchet member 51 will now be discussed in more detail. As seen in FIGS. 6 and 7, the first ratchet member 51 is an annular member that is concentrically disposed around the hub axle 30. The first ratchet member 51 has at least one first ratchet tooth 60. The at least one first ratchet tooth is disposed on a first axially facing surface 61 of the first ratchet member 51. Here, the first ratchet member 51 includes a plurality of first ratchet teeth 60. The first ratchet teeth 60 are formed on the first axially facing surface 61 that axially faces the second ratchet member 52. The first ratchet teeth 60 are configured to engage the second ratchet member 52 as seen in FIG. 12 so that the first ratchet member 51 and the second ratchet member 52 can rotate together in the driving rotational direction D1. Moreover, the first ratchet teeth 60 are configured to be able to be disengaged from the second ratchet member 52 as seen in FIG. 13 so that the first ratchet member 51 and the second ratchet member 52 can rotate relative to each other in the circumferential direction CD.

Figure 5:
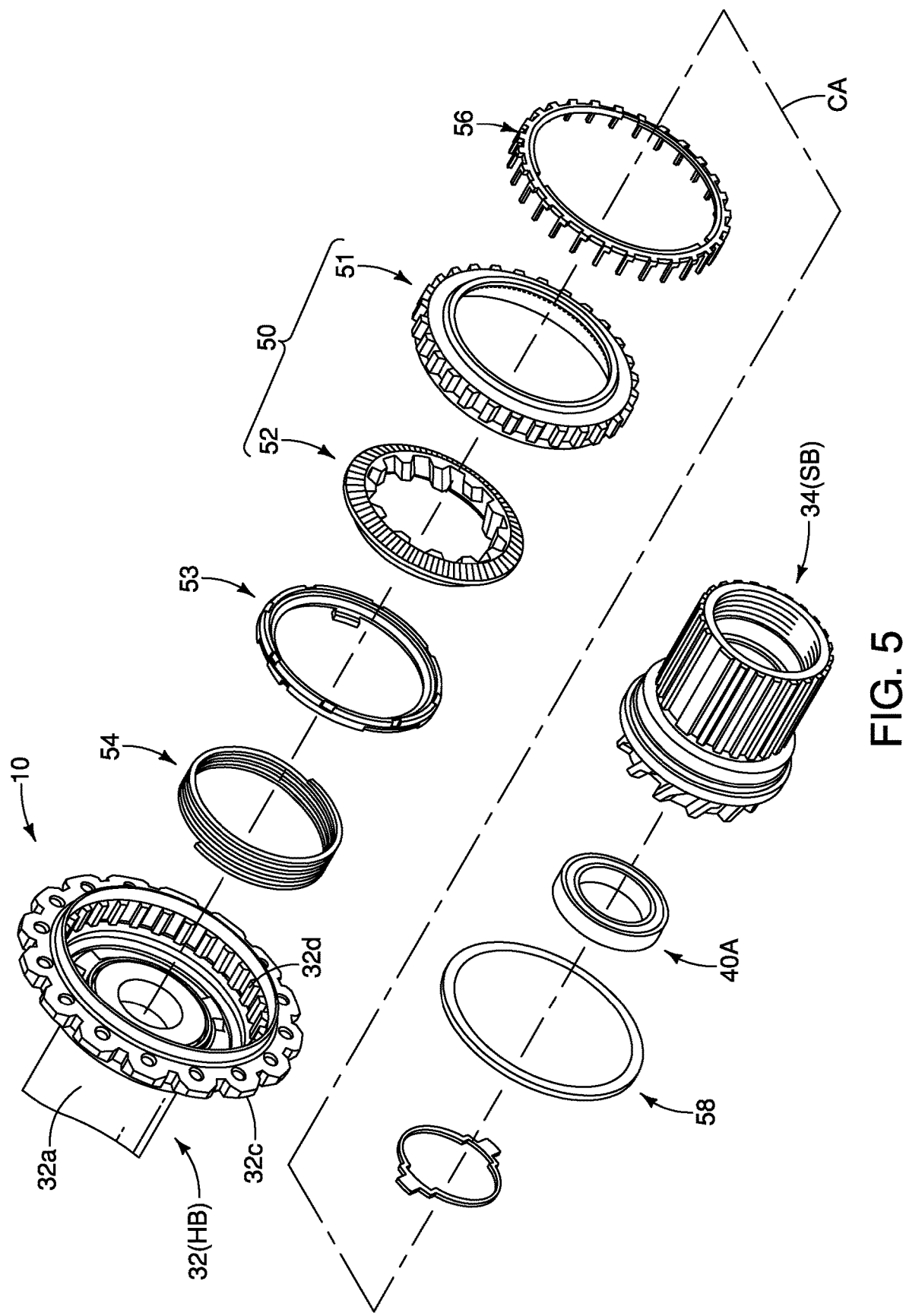
FIG. 5 is a partly exploded perspective view of other selected parts of the hub illustrated in FIGS. 2 and 3.

The first ratchet member 51 is configured to rotate with the first rotating body 32. In particular, the first ratchet member 51 also includes a plurality of protrusions 62 formed on an outer peripheral surface of the first ratchet member 51. The protrusions 62 form an engagement portion that engages a plurality of protrusions 32d (see FIG. 5) of the first rotating body 32. More specifically, the circumferential spacer 56 has a plurally of axially extending prongs disposed between the protrusions 62 of the first ratchet member 51 and the protrusions 32d of the first rotating body 32 to take up the circumferential spaces between the protrusions 62 of the first ratchet member 51 and the protrusions 32d of the first rotating body 32. In this way, torque applied from the second rotating body 34 is transferred from the first ratchet member 51 to the first rotating body 32 via the second ratchet member 52. The first ratchet member 51 is sandwiched between the abutment 34c of the second rotating body 34 and the second ratchet member 52. Here, the axial spacer 58 is disposed between the first ratchet member 51 and the abutment 34c of the second rotating body 34. In this way, movement of the first ratchet member 51 in the first axial direction A1 is restricted.

Referring to FIGS. 6 and 7, the second ratchet member 52 will now be discussed in more detail. The second ratchet member 52 is an annular member that is concentrically disposed around the hub axle 30. The second ratchet member 52 has at least one second ratchet tooth 64 mating with the at least one first ratchet tooth 60. The at least one second ratchet tooth 64 is disposed on a second axially facing surface 65 of the second ratchet member 52 that faces the first axially facing surface 61 of the first ratchet member 51. Here, the second ratchet member 52 includes a plurality of second ratchet teeth 64. The second ratchet teeth 64 are formed on the second axially facing surface 65 that axially faces the first ratchet member 51. The second ratchet teeth 64 are configured to engage the first ratchet teeth 60 as seen in FIG. 12 so that the first ratchet member 51 and the second ratchet member 52 can rotate together in the driving rotational direction D1. Moreover, the second ratchet teeth 64 are configured to be able to be disengaged from the first ratchet teeth 60 as seen in FIG. 13 so that the first ratchet member 51 and the second ratchet member 52 can rotate relative to each other in the circumferential direction CD.

The second ratchet member 52 is movably supported on the second rotating body 34 via the first helical spline 34b. However, the second ratchet member 52 is configured to rotate with the second rotating body 34 as the second rotating body 34 rotates in the driving rotational direction D1. On the other hand, the second ratchet member 52 is configured to move both axially and circumferentially with respect to the second rotating body 34 for limited range of movement as the second rotating body 34 rotates in the non-driving direction D2 with respect to the first rotating body 32. In particular, the second ratchet member 52 has a second helical spline 66 mating with the first helical spline 34b. The second ratchet member 52 is movably mounted in an axial direction with respect to the second rotating body 34 via the second helical spline 66 in engagement with the first helical spline 34b while the second ratchet member 52 is being driven by a thrust force that is applied from the first rotating body 32 via the slider 53. Here, the second ratchet member 52 includes a plurality of the second helical splines 66. The second helical splines 66 are helically arranged with respect to the center axis CA. The second helical splines 66 mates with the first helical spline 34b of the second rotating body 34 to allow a limited range of movement in the axial direction and the circumferential direction CD. In this way, the second ratchet member 52 is movably mounted in the first axial direction A1 or the second axial direction A2 with respect to the second rotating body 34 via the second helical splines 66 engaging the first helical spline 34b. Here, the second ratchet member 52 includes a plurality of the second helical splines 66.

The second ratchet member 52 has an axially facing surface 67 and a radially facing surface 68. The axially facing surface 67 and the radially facing surface 68 are preferably annular surfaces that are concentrically disposed around the hub axle 30. The axially facing surface 67 and the radially facing surface 68 are configured to slidably contact the slider 53 as discussed below.

Referring to FIGS. 8 to 13, the slider 53 will now be discussed in more detail. The slider 53 is coupled to the first rotating body 32 for allowing a limited range of movement of the slider 53 in the axial direction and the circumferential direction CD. On the other hand, the slider 53 is configured to be allowed circumferential sliding of the slider 53 with respect to the second rotating body 34 and the second ratchet member 52 in a state where the second rotating body 34 and the second ratchet member 52 are rotating in the non-driving direction D2 with respect to the first rotating body 32. Basically, the slider 53 includes a first slider part 71 and a second slider part 72. Here, the slider 53 further includes a third slider part 73. The first slider part 71, the second slider part 72 and the third slider part 73 are each annular members. The first slider part 71, the second slider part 72 and the third slider part 73 are non-movably coupled together. Thus, here, the first slider part 71 is non-movably fixed to the second slider part 72. Also, here, the third slider part 73 is non-rotatably coupled to the first slider part 71 and the second slider part 72. Accordingly, the first slider part 71, the second slider part 72 and the third slider part 73 are non-movably fixed together as a unit. Here, the first slider part 71 and the third slider part 73 are snap-fitted together. The second slider part 72 is sandwiched between the first slider part 71 and the third slider part 73.

The slider 53 has a first contact surface 74 in sliding contact with an axially facing surface of one of the first ratchet member 51 and the second ratchet member 52 coupled to the second rotating body 34. Here, the first slider part 71 includes the first contact surface 74. Also, here, the first contact surface 74 is sliding contact with the axially facing surface 67 of the second ratchet member 52. The slider 53 has a second contact surface 76 in sliding contact with a radially facing surface of the one of the first ratchet member 51 and the second ratchet member 52 coupled to the second rotating body 34. Here, the second slider part 72 includes the second contact surface 76. Also, here, the second contact surface 76 is sliding contact with the radially facing surface 68 of the second ratchet member 52. The first contact surface 74 and the second contact surface 76 are annular surfaces arranged around the center axis CA. The first contact surface 74 is spaced from the center axis CA by a first radial distance X1. On the other hand, the second contact surface 76 is spaced from the center axis CA by a second radial distance X2. The second radial distance X2 is equal to or less than the first radial distance X1. Here, the second radial distance X2 is less than the first radial distance X1. In the case where the first contact surface 74 is in surface contact with the axial facing surface 67, the first contact surface 74 has a radial width. Thus, the first radial distance X1 corresponds to a radial center position of the first contact surface 74 from the center axis CA or a shortest distance from the center axis CA. In the drawings, the first radial distance X1 is indicated as the shortest distance from the center axis CA. However, the first radial distance X1 can be the distance between the radial center position of the first contact surface 74 and the center axis CA.

The first contact surface 74 and the second contact surface 76 have different coefficients of friction. Here, the first contact surface 74 is a different material than the second contact surface 76. For example, in the first embodiment, the first slider part 71 includes a resin material. For example, in the first embodiment, the second slider part 72 includes an elastomeric material. In particular, in the first embodiment, the second slider part 72 includes a support portion 78 and a contact portion 80. The support portion 78 is made of a generally rigid material such as a metallic material or a resin material. Here, the support portion 78 is a metal ring and the contact portion 80 is elastomeric material that at least partially covers the support portion 78. Thus, the contact portion 80 includes the second contact surface 76. The third slider part 73 is made of a material with which the torque of the first rotating body 32 can be effectively transmitted to the third slider part 73 so that the slider 53 can rotate with the first rotating body 32. For example, in the first embodiment, the third slider part 73 includes a resin material. Thus, in the first embodiment, the third slider part 73 includes a different material from the second slider part 72.

Referring to FIGS. 15 to 19, the slider 53 has a first anti-rotation portion 82 mating with a second anti-rotation portion 32e of the first rotating body 32. The first anti-rotation portion 82 and the second anti-rotation portion 32e are configured to mate together so as to allow axial movement of the slider 53 relative to the first rotating body 32 in an axial direction with respect to the center axis CA. The at least one first ratchet tooth 60 and the at least one second ratchet tooth 64 are changed from disengaged (FIG. 13) to engaged (FIG. 12) while the slider 53 rotates with the second ratchet member 52 with respect to the first ratchet member 51 in the circumferential direction CD with respect to the center axis CA. The hub 10 is configured such that the first ratchet member 51 and the second ratchet member 52 are spaced apart in the axial direction with respect to the center axis CA during coasting. Therefore, a noise during coasting is reduced. The at least one first ratchet tooth 60 and the at least one second ratchet tooth 64 are configured to be changed from disengaged to engaged so as at least one tip of the least one first ratchet tooth 60 and at least one tip of the least one second ratchet tooth 64 approach each other in the axial direction with respect to the center axis CA while the first ratchet member 51 and the second ratchet member 52 rotate relative to each other in the circumferential direction CD with respect to the center axis CA.

The first anti-rotation portion 82 includes at least one first circumferentially-facing surface 82a. Here, the first anti-rotation portion 82 includes a plurality of the first circumferentially-facing surface 82a. For example, the first anti-rotation portion 82 has a plurality of projections, each of which has at least one first circumferentially-facing surface 82a. In particular, the first anti-rotation portion 82 includes three of the first circumferentially-facing surface 82a. The first circumferentially-facing surface 82a are equally spaced apart around the center axis CA. The second anti-rotation portion 32e includes at least one second circumferentially-facing surface 32e1 that abuts the at least one first circumferentially-facing surface 82a in the circumferential direction CD with respect to the center axis CA. Here, the second anti-rotation portion 32e includes a plurality of the second circumferentially-facing surface 32e1. For example, the second anti-rotation portion 32e has a plurality of recesses, each of which has at least one second circumferentially-facing surface 32e1. In particular, the second anti-rotation portion 32e includes three of the second circumferentially-facing surface 32e1. The second circumferentially-facing surface 32e1 are equally spaced apart around the center axis CA. At least one of the at least one first circumferentially-facing surface 82a and the at least one second circumferentially-facing surface 32e1 includes an inclined surface inclined relative to the axial direction with respect to the center axis CA. Here, the at least one second circumferentially-facing surface 32e1 includes an inclined surface. In particular, each of the second circumferentially-facing surface 32e1 includes an inclined surface.

One of the first anti-rotation portion 82 and the second anti-rotation portion 32e includes at least one convex portion and the other of the first anti-rotation portion 82 and the second anti-rotation portion 32e includes at least one concave portion. Here, the first anti-rotation portion 82 of the slider 53 includes the at least one convex portion 82b and the second anti-rotation portion 32e of the first rotating body 32 includes the at least one concave portion 32e2. In particular, the first anti-rotation portion 82 of the slider 53 has three convex portions 82b, and the second anti-rotation portion 32e of the first rotating body 32 has three concave portions 32e2. Each of the three convex portions 82b forms one of the first circumferentially-facing surfaces 82a. Each of the concave portion 32e2 forms one of the circumferentially-facing surface 32e1. Here, the second anti-rotation portion 32e has a convex portion 32e3 that is located between the concave portions 32e2.

In a case where the first ratchet tooth 60 and the second ratchet tooth 64 are engaged, the driving force inputted to the second rotating body 34 is transmitted to the first rotating body 32 via the second ratchet member 52 and the first ratchet member 51. Thus, when the second rotating body 34 is rotated in the driving rotational direction D1 by the chain 16, a torque is transmitted from the second rotating body 34 to the first rotating body 32 via the first ratchet member 51 and the second ratchet member 52. In this case, the first rotating body 32, the second rotating body 34, the first ratchet member 51, the second ratchet member 52 and the slider 53 all rotate together.

On the other hand, when the second rotating body 34 is rotated in the non-driving direction D2 relative to the first rotating body 32 such as during coasting or a rider pedaling backwards, the second ratchet member 52 moves in the second axial direction A2 away from the first ratchet member 51 against the force of the biasing member 54. Once the second ratchet member 52 is disengaged from the first ratchet member 51, the first rotating body 32 and the slider 53 rotate together. In other words, in a case where the engagement between the first ratchet tooth 60 and the second ratchet tooth 64 is disengaged (e.g., a coasting state or a rider pedaling backwards), the first rotating body 32 rotates and drives the slider 53 in the driving rotational direction D1. In this way, a rotational force is transmitted from first rotating body 32 to the slider 53. In particular, the rotational force transmitted from the first rotating body 32 to the slider 53 is transmitted from the second circumferentially-facing surfaces 32e1 of the first rotating body 32 to the first circumferentially-facing surfaces 82a of the slider 53. A sliding frictional force is then generated between the slider 53 and the second ratchet member 52.

In a case where the rider starts to pedal after coasting, the frictional force between the slider 53 and the second ratchet member 52 becomes smaller. Thus, in this case, since the frictional force between the slider 53 and the second ratchet member 52 is reduced, the force with which the second helical spline 66 is pressed against the first helical spline 34b is reduced. The second ratchet member 52 approaches the first ratchet member 51 due to the spring force of the biasing member 54. Even in this case, the rotational force of the slider 53 is transmitted from the first rotating body 32. That is, the rotational force of the slider 53 is transmitted from the second circumferentially-facing surfaces 32e1 of the first rotating body 32 to the first circumferentially-facing surfaces 82a of the slider 53. Due to the inclined surface of the circumferentially-facing surface 32e1 of the first rotating body 32, the slider 53 moves in the first axial direction A1 and rotates in the non-driving rotational direction D2 respect to the first rotating body 32 as the first ratchet teeth 60 and the second ratchet teeth 64 are changed from disengaged (FIG. 13) to engaged (FIG. 12). After that, when the second ratchet teeth 64 engage with the first ratchet teeth 60, the rotational force of the slider 53 is transmitted from the second ratchet member 52.

Figure 20:
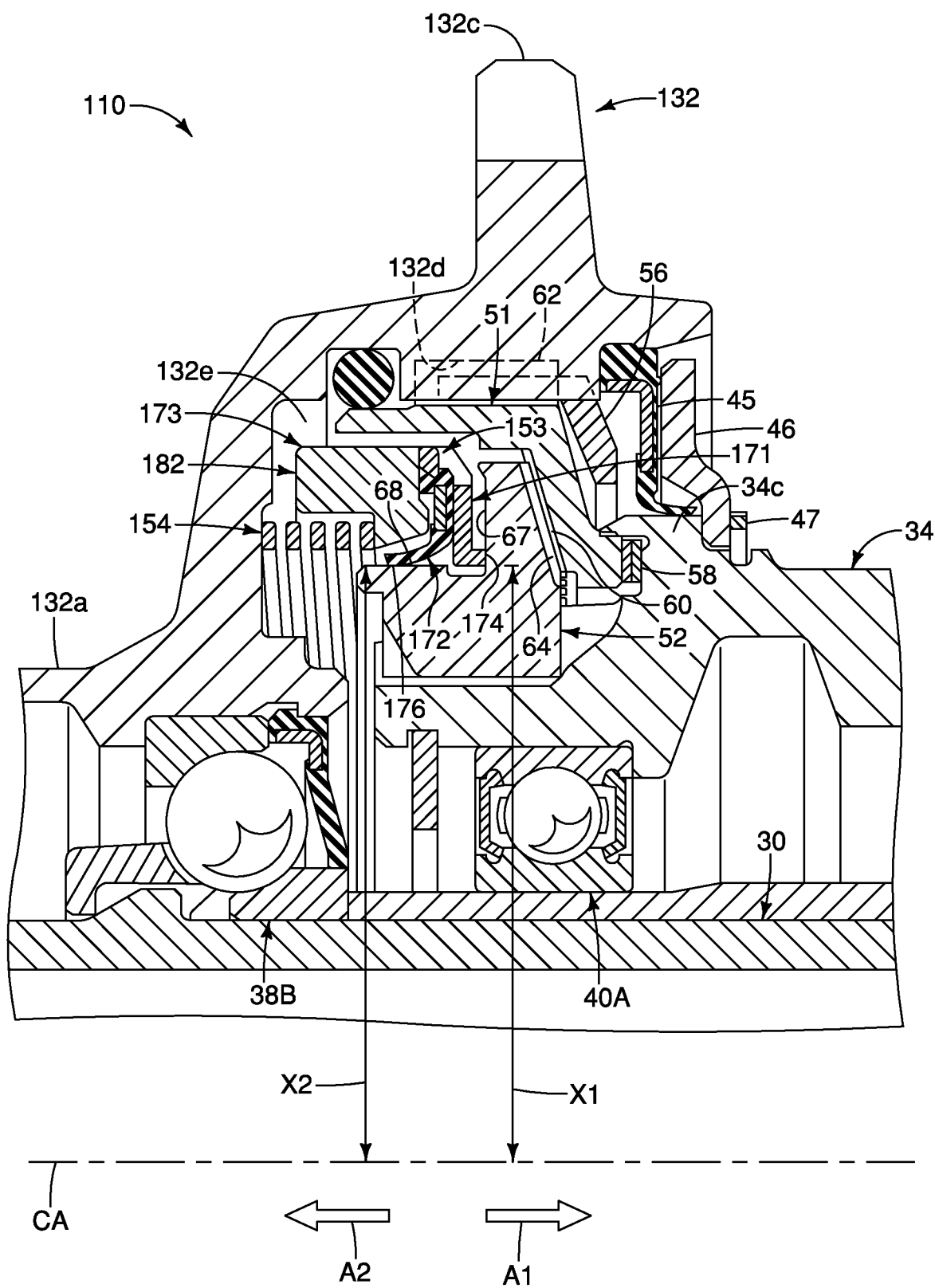
FIG. 20 is an enlarged cross sectional view of a hub in accordance with a second embodiment.

Referring now to FIG. 20, a hub 110 is illustrated in accordance with a second embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Here, the hub 110 is identical to the hub 10, except that the first rotating body 32 has been replaced with a first rotating body 132, the slider 53 has been replaced with a slider 153, and the biasing member 54 has been replaced with a biasing member 154. Thus, the following description of the hub 110 will focus on the first rotating body 132, the slider 153 and the biasing member 154.

In the second embodiment, similar to the first embodiment, the first rotating body 132 has a center tubular body 132a and a pair of spoke attachment flanges 132c (only one shown) extending outwardly in a radial direction from the center tubular body 132a. Also, similar to the first embodiment, the first rotating body 132 has a plurality of protrusions 132d for engaging the protrusions 62 of the first ratchet member 51 via the prongs of the circumferential spacer 56. The first rotating body 132 differs from the first rotating body 32 in that the first rotating body 132 has a second anti-rotation portion 132e that is located radially outward as compared the first rotating body 32e. The second anti-rotation portion 132e are identical in configuration to the first rotating body 32e, except for the location of the second anti-rotation portion 132e as mentioned above.

In the second embodiment, similar to the first embodiment, the slider 153 includes a first slider part 171, a second slider part 172 and a third slider part 173. Also, similar to the first embodiment, the first slider part 171 has a first contact surface 174 in sliding contact with an axially facing surface of the first ratchet member 51, and the second slider part 172 includes a second contact surface 176 in sliding contact with the radially facing surface 68 of the second ratchet member 52. Here, the second slider part 172 is identical to the second slider part 72 discussed above. The first slider part 171 has the same configuration as the first slider part 71, except that the first slider part 171 has been modified so that the first contact surface 174 is spaced from the center axis CA by the first radial distance X1 and the first radial distance X1 is equal to the second radial distance X2. The third slider part 173 has the same configuration as the third slider part 73, except that the third slider part 173 has been modified so that the coils of the biasing member 154 at least partially aligned with the first contact surface 174 as viewed in the axial direction.

In the second embodiment, similar to the first embodiment, the biasing member 154 is configured to bias the slider 153 and the second ratchet member 52 towards the first ratchet member 51. The biasing member 154 only differs from the biasing member 54 in that the outer diameter of the biasing member 154 is smaller than the outer diameter of the biasing member 54.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the hub. Accordingly, these directional terms, as utilized to describe the hub should be interpreted relative to a human-powered vehicle (e.g., bicycle) in an upright riding position on a horizontal surface and that is equipped with the hub. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub for a human-powered vehicle, the hub comprising:
a hub axle defining a center axis;
a first rotating body rotatably mounted on the hub axle to rotate around the center axis;
a second rotating body rotatably mounted on the hub axle to rotate around the center axis;
a first ratchet member having at least one first ratchet tooth, the first ratchet member being coupled to the first rotating body to rotate with the first rotating body;
a second ratchet member having at least one second ratchet tooth mating with the at least one first ratchet tooth, the second ratchet member being coupled to the second rotating body to rotate with the second rotating body; and
a slider configured to rotate with the first rotating body and to slide with respect to the second rotating body in a circumferential direction with respect to the center axis,
the slider having a first contact surface in sliding contact with an axially facing surface of the second ratchet member coupled to the second rotating body,
the slider having a second contact surface in sliding contact with a radially facing surface of the second ratchet member coupled to the second rotating body,
the first contact surface is a different material than the second contact surface, the second contact surface including an elastomeric material.

2. The hub according to claim 1, wherein
the slider has a first anti-rotation portion mating with a second anti-rotation portion of the first rotating body,
the first anti-rotation portion and the second anti-rotation portion are configured to mate together so as to allow axial movement of the slider relative to the first rotating body in an axial direction with respect to the center axis, the at least one first ratchet tooth and the at least one second ratchet tooth are changed from disengaged to engaged while the slider rotates with the second ratchet member with respect to the first ratchet member in a circumferential direction with respect to the center axis.

3. The hub according to claim 1, wherein
the slider has a first anti-rotation portion mating with a second anti-rotation portion of the first rotating body,
the first anti-rotation portion including at least one first circumferentially-facing surface, the second anti-rotation portion including at least one second circumferentially-facing surface that abuts the at least one first circumferentially-facing surface in the circumferential direction with respect to the center axis,
at least one of the at least one first circumferentially-facing surface and the at least one second circumferentially-facing surface including an inclined surface inclined relative to the axial direction with respect to the center axis.

4. The hub according to claim 1, wherein
the first contact surface includes a resin material.

5. The hub according to claim 1, wherein
the first contact surface and the second contact surface are annular surfaces arranged around the center axis.

6. The hub according to claim 1, wherein
the slider includes a first slider part including the first contact surface, a second slider part including the second contact surface, and a third slider part non-rotatably coupled to the first slider part and the second slider part.

7. The hub according to claim 6, wherein
the third slider part includes a different material from the second slider part.

8. The hub according to claim 6, wherein
the first slider part includes a resin material,
the second slider part includes an elastomeric material, and
the third slider part includes a resin material.

9. The hub according to claim 1, further comprising
a biasing member disposed between the first rotating body and the slider, the biasing member biasing the second ratchet member via the slider in the axial direction with respect to the center axis towards engagement with the first ratchet member.

10. The bicycle hub according to claim 1, wherein
the at least one first ratchet tooth is disposed on a first axially facing surface of the first ratchet member, and
the at least one second ratchet tooth is disposed on a second axially facing surface of the second ratchet member that faces the first axially facing surface of the first ratchet member.

11. The bicycle hub according to claim 1, wherein
the first and second ratchet members are annular members arranged around the center axis.

12. The bicycle hub according to claim 1, wherein
the second rotating body has a first helical spline disposed on an outer peripheral surface of the second rotating body, and
the second ratchet member has a second helical spline mating with the first helical spline, the second ratchet member is movably mounted in an axial direction with respect to the second rotating body via the second helical spline in engagement with the first helical spline while the second ratchet member is being driven by a thrust force that is applied from the second rotating body.

13. The hub according to claim 1, wherein
the second rotating body is coupled to the first rotating body to rotate together in a driving rotational direction around the center axis, and the second rotating body is configured to rotate relative to the first rotating body in a non-driving rotational direction around the center axis.

14. The hub according to claim 1, wherein
the first rotating body includes a hub body and the second rotating body includes a sprocket support body.

15. A hub for a human-powered vehicle, the hub comprising:
a hub axle defining a center axis;
a first rotating body rotatably mounted on the hub axle to rotate around the center axis;
a second rotating body rotatably mounted on the hub axle to rotate around the center axis;
a first ratchet member having at least one first ratchet tooth, the first ratchet member being coupled to the first rotating body to rotate with the first rotating body;
a second ratchet member having at least one second ratchet tooth mating with the at least one first ratchet tooth, the second ratchet member being coupled to the second rotating body to rotate with the second rotating body; and a slider configured to rotate with the first rotating body and to slide with respect to the second rotating body in a circumferential direction with respect to the center axis, the slider having a first contact surface in sliding contact with an axially facing surface of the second ratchet member coupled to the second rotating body, the slider having a second contact surface in sliding contact with a radially facing surface of the second ratchet member coupled to the second rotating body, the slider including a first slider part including the first contact surface and a second slider part including the second contact surface, the first slider part being a separate member from the second slider part, the first slider part being non-movably fixed to the second slider part, the second slider part including a support portion, the support portion supporting the first slider part and being made of a different material than the second contact surface.

16. The hub according to claim 15, wherein
the first slider part contacts the second slider part in the axial direction in an assembled state of the hub.

17. A hub for a human-powered vehicle, the hub comprising:
a hub axle defining a center axis;
a first rotating body rotatably mounted on the hub axle to rotate around the center axis;
a second rotating body rotatably mounted on the hub axle to rotate around the center axis;
a first ratchet member having at least one first ratchet tooth, the first ratchet member being coupled to the first rotating body to rotate with the first rotating body;
a second ratchet member having at least one second ratchet tooth mating with the at least one first ratchet tooth, the second ratchet member being coupled to the second rotating body to rotate with the second rotating body; and
a slider configured to rotate the first rotating body and to slide with respect to the second rotating body in a circumferential direction with respect to the center axis,
the slider having a first contact surface in sliding contact with an axially facing surface of the second ratchet member coupled to the second rotating body,
the slider having a second contact surface in sliding contact with a radially facing surface of the second ratchet member coupled to the second rotating body,
the first contact surface being spaced from the center axis by a first radial distance, the second contact surface being spaced from the center axis by a second radial distance,
the slider having an axial protrusion protruding in an axial direction and a radial protrusion protruding in a radial direction, the axial protrusion having the first contact surface, and the radial protrusion having the second contact surface.

18. The hub according to claim 17, wherein
the second radial distance is equal to or less than the first radial distance.

19. The hub according to claim 17, wherein
the slider includes a first slider part including the axial protrusion and a second slider part including the radial protrusion.

20. A hub for a human-powered vehicle, the hub comprising:
a hub axle defining a center axis,
a first rotating body rotatably mounted on the hub axle to rotate around the center axis;
a second rotating body rotatably mounted on the hub axle to rotate around the center axis;
a first ratchet member having at least one first ratchet tooth, the first ratchet member being coupled to the first rotating body to rotate with the first rotating body;
a second ratchet member having at least one second ratchet tooth mating with the at least one first ratchet tooth, the second ratchet member being coupled to the second rotating body to rotate with the second rotating body; and
a slider configured to rotate with the first rotating body and to slide with respect to the second rotating body in a circumferential direction with respect to the center axis,
the slider having a first anti-rotation portion mating with a second anti-rotation portion of the first rotating body, the first anti-rotation portion including at least one first circumferentially-facing surface, the second anti-rotation portion including at least one second circumferentially-facing surface that abuts the at least one first circumferentially-facing surface in a circumferential direction with respect to the center axis,
at least one of the at least one first circumferentially-facing surface and the at least one second circumferentially-facing surface including an inclined surface inclined relative to an axial direction with respect to the center axis.

21. The hub according to claim 20, wherein
one of the first anti-rotation portion and the second anti-rotation portion includes at least one convex portion and the other of the first anti-rotation portion and the second anti-rotation portion includes at least one concave portion.

22. The hub according to claim 20, wherein
the first anti-rotation portion and the second anti-rotation portion are configured to mate together so as to allow axial movement of the slider relative to the first rotating body in an axial direction with respect to the center axis, and
the at least one first ratchet tooth and the at least one second ratchet tooth are changed from disengaged to engaged while the slider rotates with the second ratchet member with respect to the first ratchet member in the circumferential direction with respect to the center axis.

* * * * *